United States Patent
Iwata et al.

(10) Patent No.: US 8,655,630 B2
(45) Date of Patent: Feb. 18, 2014

(54) APPARATUS, SYSTEM, AND METHOD FOR CONSTRUCTION OF A DESIGN WORKFLOW

(75) Inventors: Yoshiharu Iwata, Suita (JP); Ryohei Satoh, Suita (JP); Keiji Kudo, Suita (JP); Atsushi Taya, Suita (JP); Kazuya Okamoto, Suita (JP); Hidenori Murata, Suita (JP); Koichiro Atsumi, Suita (JP); Eiji Arai, Suita (JP); Eiji Morinaga, Suita (JP)

(73) Assignee: Osaka University, Osaka (JP)

( * ) Notice: Subject to any disclaimer, the term of this patent is extended or adjusted under 35 U.S.C. 154(b) by 175 days.

(21) Appl. No.: 13/201,854

(22) PCT Filed: Feb. 16, 2010

(86) PCT No.: PCT/JP2010/000943
§ 371 (c)(1),
(2), (4) Date: Oct. 27, 2011

(87) PCT Pub. No.: WO2010/095418
PCT Pub. Date: Aug. 26, 2010

(65) Prior Publication Data
US 2012/0053905 A1 Mar. 1, 2012

(30) Foreign Application Priority Data
Feb. 17, 2009 (JP) .................................. 2009-034535

(51) Int. Cl.
*G06F 17/50* (2006.01)
(52) U.S. Cl.
USPC ............. 703/2; 709/219; 705/7.12; 705/7.23
(58) Field of Classification Search
USPC ...................... 703/2; 709/219; 705/7.23, 7.12
See application file for complete search history.

(56) References Cited

U.S. PATENT DOCUMENTS

| | | | | |
|---|---|---|---|---|
| 6,571,282 B1 * | 5/2003 | Bowman-Amuah | .......... | 709/219 |
| 6,615,199 B1 * | 9/2003 | Bowman-Amuah | ............ | 706/50 |
| 7,035,809 B2 * | 4/2006 | Miller et al. | ................. | 705/7.23 |
| 7,937,281 B2 * | 5/2011 | Miller et al. | ................. | 705/7.12 |
| 2003/0097642 A1 | 5/2003 | Arai et al. | | |
| 2004/0111327 A1 * | 6/2004 | Kidd et al. | ...................... | 705/26 |
| 2006/0235732 A1 * | 10/2006 | Miller et al. | ..................... | 705/7 |
| 2011/0295643 A1 * | 12/2011 | Miller et al. | ................. | 705/7.23 |

FOREIGN PATENT DOCUMENTS

| | | | |
|---|---|---|---|
| JP | 2000-148879 A | | 5/2000 |
| JP | 2003-132094 A | | 5/2003 |
| JP | 2003-141192 A | | 5/2003 |
| JP | 2003-203148 A | | 7/2003 |
| JP | 2004-192606 A | | 7/2004 |

OTHER PUBLICATIONS

Weilkiens, Tim, "Chapter 4: SysML—The Systems Modeling Language", Systems Engineering with SysML/UML, Medeling Analysis, Design, Elsevier, 2006, pp. 223-227 and 242-257.

(Continued)

*Primary Examiner* — Thai Phan
(74) *Attorney, Agent, or Firm* — Morrison & Foerster LLP

(57) ABSTRACT

A design workflow construction apparatus is provided for supporting design of an object having a plurality of design elements. In constructing the design workflow, the apparatus uses input variables, design variables, and intermediate variables. The design workflow construction apparatus includes means for acquiring object design elements and means for determining an order of designing the object design elements. The apparatus also includes means for determining the important design variables.

15 Claims, 17 Drawing Sheets

(56) References Cited

OTHER PUBLICATIONS

Browning (Aug. 2001). "Applying the Design Structure Matrix to System Decomposition and Integration Problems: A Review and New Directions," IEEE Transactions of Engineering Management 48(3):292-306.

International Search Report mailed May 18, 2010, for PCT Application No. PCT/JP2010/000943, filed on Feb. 2, 2010. 4 pages (4 pages of English translation).

International Search Report mailed May 18, 2010, for PCT Application No. PCT/JP2010/000943, filed on Feb. 16, 2010. 4 pages. (4 pages of English translation).

\* cited by examiner

FIG. 7

| INPUT VARIABLE | |
|---|---|
| COMMAND LENGTH | EXTERNAL I/O AREA |
| MOUNTING DELAY | EXTERNAL I/O POWER CONSUMPTION |
| BOARD COST | NUMBER OF LOGIC MASKS |
| MOUNTING COST | RESERVE FOR CUTTING OF LOGIC CHIP |
| LINE COST | LOGIC MASK COST |
| PRODUCTION NUMBER | LOGIC DESIGN COST |
| EXTERNAL TERMINAL AREA | GATE DRIVE RATE |
| BOARD HEIGHT | GATE LENGTH/WIDTH RATIO |
| MOUNTING SECTION HEIGHT | I/O DRIVER COEFFICIENT |
| MOLD HEIGHT | MEMORY FREQUENCY |
| AVERAGE NUMBER OF LOGIC STAGES | NUMBER OF MEMORY MASKS |
| CACHE HIT RATE | CHIP THICKNESS |
| AVERAGE NUMBER OF EXECUTED COMMANDS | TSV PITCH |
| TOTAL MEMORY CAPACITY | RATIO BETWEEN SIGNAL AND Vdd & GND PIN NUMBER |
| NUMBER OF TRANSISTORS IN WHICH GATE IS FORMED | MEMORY DRIVE RATE |
| NUMBER OF EXTERNAL TERMINALS | RESERVE FOR CUTTING OF MEMORY CHIP |
| LARGEST WIRE GATE PITCH OF INTERMEDIATE WIRE | MEMORY CHIP DEFECT DENSITY |
| LOGIC CHIP DEFECT DENSITY | |

FIG. 8

| DESIGN VARIABLE ||
|---|---|
| NUMBER OF DIVISIONS OF CHIP | MEMORY CHIP TECHNOLOGY NODE |
| LOGIC CHIP TECHNOLOGY NODE | SIGNAL PIN NUMBER BETWEEN MEMORY AND LOGIC |

FIG. 9

| OUTPUT VARIABLE ||
|---|---|
| COST | PROCESSING SPEED |
| POWER CONSUMPTION | SPATIAL VOLUME |
| SDSI-C | |

FIG. 10

| System LSI | Logic Chip | General-Purpose Logic Circuit | Logic Block | Intermediate Wire |
|---|---|---|---|---|
| System LSI SDSI-C<br>System LSI Power Consumption<br>System LSI Processing Performance<br>The rest is omitted | Logic Chip Power Consumption<br>Logic Chip Area<br>Logic Chip Thickness<br>The rest is omitted | General-Purpose Logic Circuit Power Consumption<br>General-Purpose Logic Circuit Area<br>General-Purpose Logic Circuit Processing Performance<br>The rest is omitted | Average Number of Logic Stages<br>Skew Time<br>Wire Delay between Gates of Logic Blocks<br>The rest is omitted | Intermediate Wire Pitch<br>Delay of Interconnect Wire Per Unit Length |
| | | | | Logic Gate |
| | | | | Logic Chip Gate Delay<br>The rest is omitted |
| | | | Semi Global Wire | |
| | | | Semi Global Wire Delay Per Unit Length | |
| | | Cache Memory Module | Cache Memory Cell | |
| | | Cache Memory Area<br>The rest is omitted | Cache Memory Cell Static Power Consumption<br>The rest is omitted | |
| | | Logic I/O Module | Logic-Main Memory I/O Driver | Logic-Main Memory I/O Gate |
| | | Logic I/O Power Consumption<br>Logic-Main Memory I/O Area<br>Logic-Main Memory I/O Signal Pin Number<br>The rest is omitted | Logic-Main Memory I/O Driver Capability<br>The rest is omitted | Logic-Main Memory I/O Gate Size<br>The rest is omitted |
| | | | External I/O Driver | External I/O Gate |
| | | | External I/O Driver Capability<br>The rest is omitted | External I/O Gate Size<br>The rest is omitted |
| | | Logic Global Wire | | |
| | | Delay Time Per Unit Area of Logic Global Wire | | |
| | Main Memory Chip | Main Memory Module | Main Memory Cell | |
| | Main Memory Chip Power Consumption<br>Main Memory Chip Area<br>Main Memory Chip Thickness<br>The rest is omitted | Main Memory Area<br>The rest is omitted | Main Memory Cell Static Power Consumption<br>The rest is omitted | |
| | | Main Memory I/O Module | Main Memory I/O Driver | Main Memory I/O Gate |
| | | Main Memory I/O Power Consumption<br>Main Memory I/O Area<br>Logic-Main Memory Signal Pin Number<br>The rest is omitted | Logic-Main Memory I/O Driver Capability<br>The rest is omitted | Main Memory I/O Gate Size<br>The rest is omitted |
| | | | Main Memory TSV | |
| | | | Main Memory TSV Pitch<br>The rest is omitted | |
| | | Main Memory Global Wire | | |
| | | Main Memory Global Wire Length<br>The rest is omitted | | |
| | Jisso | Interposer Board | | |
| | Packaging Cost<br>Packaging Production Line Cost<br>Package Production Number<br>The rest is omitted | Interposer Board Cost<br>The rest is omitted | | |
| | | Mold | | |
| | | Mold Thickness | | |
| | | Internal Bump | Logic Bump | |
| | | Main Memory Bonding Bump Delay<br>Logic-Main Memory Signal Pin Number<br>Memory-Power Supply Pin Number<br>The rest is omitted | Logic Bump Height | |
| | | | Main Memory Bump | |
| | | | Main Memory Bump Height | |
| | | External Bump | | |
| | | System LSI Package Pin Number<br>The rest is omitted | | |

| | LOGIC CHIP COST |
|---|---|
| FORMULA | LOGIC CHIP COST=CoG (LOGIC CHIP TECHNOLOGY NODE, LOGIC CHIP AREA+RESERVE FOR CUTTING OF LOGIC CHIP, DEFECT DENSITY) × NUMBER OF MASKS+MASK COST × NUMBER OF MASKS+DESIGN COST/LOGIC CHIP PRODUCTION NUMBER |
| VARIABLE | LOGIC CHIP COST, MEMORY CHIP COST, NUMBER OF DIVISIONS OF LOGIC CHIP, NUMBER OF DIVISIONS OF MEMORY CHIP, PACKAGING COST |
| CONSTANT | NONE |
| REFERENCE SOURCE | LOGIC CHIP COST : COST 2, MEMORY CHIP COST : COST 4, PACKAGING COST : COST 5 |
| DESTINATION OF FORMULA | |

(b)

| | PACKAGE AREA |
|---|---|
| FORMULA | PACKAGE AREA=MAX(LOGIC CHIP AREA+EXTERNAL TERMINAL PITCH × NUMBER OF EXTERNAL TERMINALS, MEMORY CHIP AREA) |
| VARIABLE | LOGIC CHIP AREA, MEMORY CHIP AREA |
| CONSTANT | EXTERNAL TERMINAL PITCH, NUMBER OF EXTERNAL TERMINALS |
| REFERENCE SOURCE | LOGIC CHIP AREA : VOLUME 3, MEMORY CHIP AREA : VOLUME 17 |
| DESTINATION OF FORMULA | |

| Task Name | | 1 | 2 | 3 | 4 | 5 | 6 | 7 |
|---|---|---|---|---|---|---|---|---|
| GENERATION DESIGN | ① | ■ | × | | | × | | |
| GENERAL-PURPOSE LOGIC CIRCUIT DESIGN | ② | × | ■ | | | | | |
| CACHE CIRCUIT DESIGN | ③ | × | | ■ | | | | |
| I/O CIRCUIT DESIGN | ④ | × | × | × | ■ | | × | |
| MEMORY DESIGN | ⑤ | × | | | × | ■ | | × |
| JUNCTION DESIGN | ⑥ | | × | × | × | × | ■ | |
| BOARD DESIGN | ⑦ | | × | × | × | × | | ■ |

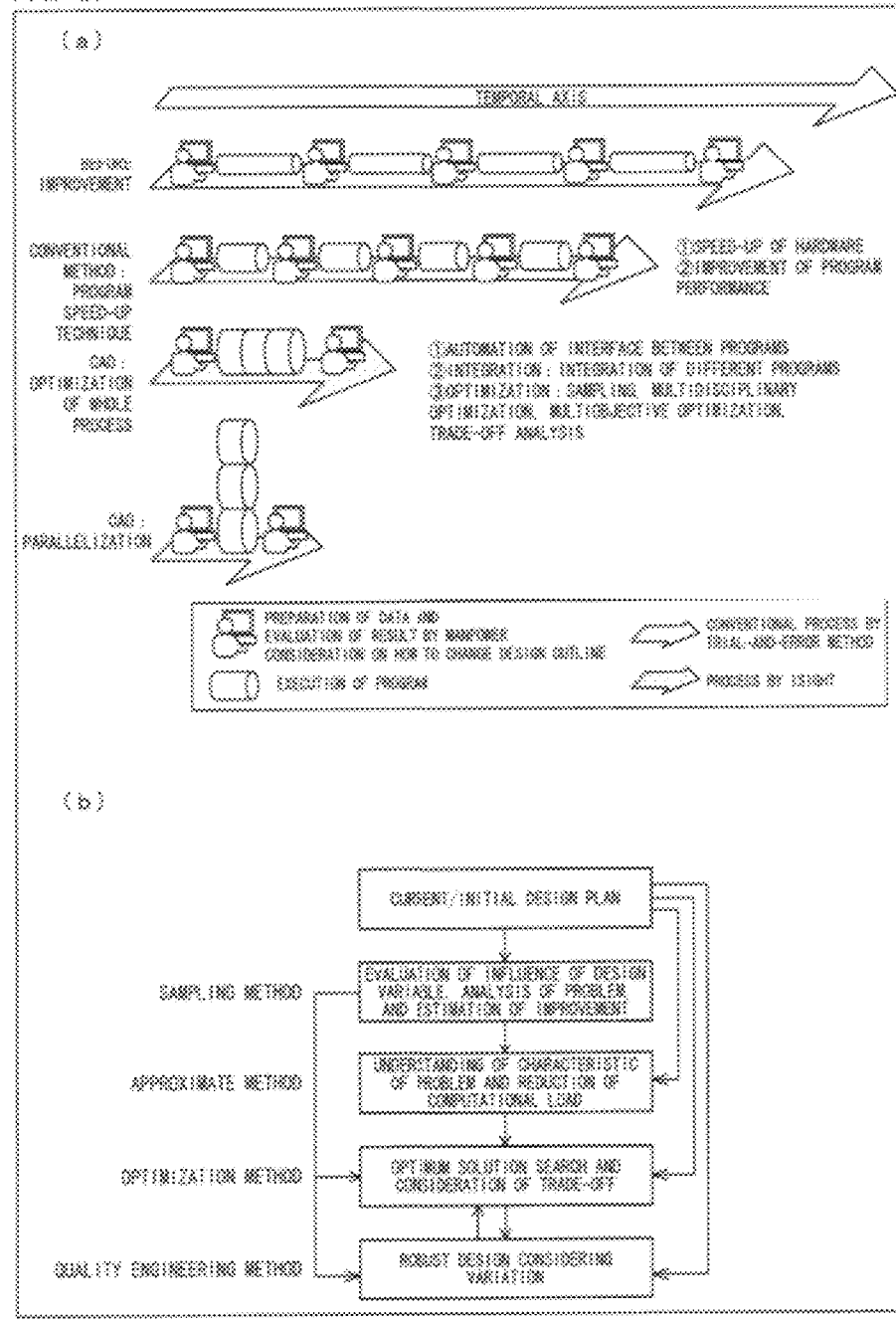

APPARATUS, SYSTEM, AND METHOD FOR CONSTRUCTION OF A DESIGN WORKFLOW

CROSS REFERENCE TO RELATED APPLICATIONS

This application is a U.S. National Phase patent application of PCT/JP2010/000943, filed Feb. 16, 2010, which claims priority to Japanese patent application Serial No. 2009-034535 filed Feb. 17, 2009, all of which are hereby incorporated by reference in the present disclosure in their entirety.

TECHNICAL FIELD

The present invention relates to an apparatus for supporting design of a system having a complicated structure. More specifically, the present invention relates to a design workflow construction apparatus, a design workflow construction method, a design system, a design method, a design workflow construction program, and a computer readable recording medium in which the design workflow construction program is stored, each of which is for constructing a design framework.

BACKGROUND ART

For example, complexity of product systems including electronics keeps on increasing, and therefore it is becoming difficult for a designer to grasp an entire system. On this account, a system is currently designed by dividing the system into sub-systems constituting the system and achieving reconciliation among the sub-systems which are individually optimally designed.

In view of the situation, various systems engineering techniques have been constructed which design a system by clearly defining the system so that the entire system can be grasped. Such systems engineering techniques include techniques for supporting individual issues of system design such as (i) a system defining technique, such as SYSML (SYStem Modeling Language) or UML (Unified Modeling Language), which allows definition of a system and sharing of information, (ii) a design flow organizing technique, such as DSM (Design Structure Matrix), which allows current design tasks to be organized, (iii) an analysis/evaluation technique, such as brief evaluation for parametrically evaluating a system on a spreadsheet or analysis using CAD (Computer Aided Design) or CAE (Computer Aided Engineering), and (iv) an automation/solution search technique such as optimization for finding an appropriate solution to a given issue.

However, at present, there is no technique integrating these techniques so as to construct a framework for obtaining an overall grasp of system design.

CITATION LIST

Non-Patent Literature 1
Tim Weilkiens, "Systems Engineering with SysML/UML: Modeling, Analysis, Design", Eslevier, 2006.

Non-Patent Literature 2
Browning, T. Applying the Design Structure Matrix to System Decomposition and Integration problems: A Review and New Directions. IEEE Transactions on Engineering management, Vol. 48, No. 3, August 2001.

SUMMARY OF INVENTION

Technical Problem

For example, in the field of a semiconductor device, an increase in performance, a reduction in power consumption, a reduction in size, and a reduction in cost have been achieved by semiconductor integration techniques all at once due to a golden rule (scaling law) of microfabrication, but are approaching physical and economic limits as the microfabrication technique develops. In view of this, a paradigm shift is occurring from an integration technique on a two-dimensional plane to an integration technique in a three-dimensional space. The integration technique in a three-dimensional space is a technique for dividing a chip into a plurality of chips and stacking the plurality of chips. This allows an improvement in performance, a reduction in power consumption, and a reduction in cost all at once in addition to an increase in performance, a reduction in power consumption, and a reduction in size achieved by microfabrication. By designing an LSI by appropriately combining these techniques, it may be possible to remarkably improve a value of the LSI. However, this three-dimensional integration technique cannot be evaluated only by the conventionally used scaling law, and therefore construction of a new proper evaluation method is essential for proper use of the techniques.

In view of this, in system design of software and a circuit within a semiconductor, a system combining the UML and DSM is proposed. In the case of software having a logical entity configuration, this system can be executed since a sub-system (entity configuration), a function, and constraint are clearly distinct from each other. However, in a semiconductor device having a physical entity configuration, a sub-system (entity configuration), a function, and constraint are not clearly distinct from each other. Accordingly, this system cannot be applied to the semiconductor device.

(a) and (b) of FIG. 20 are explanatory view explaining functions of conventional software for automation and optimization of system design. As shown in (a) of FIG. 20, automation of repetitive tasks of design simulation has been conventionally conducted. Further, as shown in (b) of FIG. 20, optimization has been conventionally achieved through repetition of a series of simulations.

However, it is a designer who decides what kind of design flow and evaluation approach is employed. Accordingly, it was impossible to conduct design study in view of entire design.

The present invention was attained in view of the above problems, and an object of the present invention is to provide a design workflow construction apparatus, a design workflow construction method, a design system, a design method, a design workflow construction program, and a computer readable recording medium in which the design workflow construction program is stored, each of which is for constructing an efficient design workflow in view of entire design even in a system having a complicated entity configuration.

Solution to Problem

In order to attain the above object, a design workflow construction apparatus of the present invention for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises: specifying information acquisition means for acquiring entity design element specifying information for specifying the plurality of entity design elements and important design variable specifying information for specifying, as important design variables, part or all of the design variables; and design order determining means for determining an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

Further, a design workflow construction method of the present invention for a design workflow construction apparatus for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of: causing design order determining means of the design workflow construction apparatus to acquire entity design element specifying information for specifying the plurality of entity design elements and important design variable specifying information for specifying, as important design variables, part or all of the design variables; and causing the design order determining means to determine an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

According to the arrangement, an order of determining part or all of the design variables (important design variables) is determined along with a design order of the entity design elements so as to reduce the number of combinations of entity design elements in which an intermediate variable determined as a design condition of a first entity design element becomes an intermediate variable obtained as a design result of a second entity design element that is designed later than the first entity design element. Note that the important design variables are preferably design variables that are used for design of a plurality of entity design elements, especially design variables that are shared in design of a larger number of entity design elements. In this specification, the entity design elements and the important design variables are collectively referred to as "design elements". That is, according to the arrangement, the order of the design elements is determined.

In a case where an object to be designed is constituted by a plurality of entity design elements and where the object to be designed is designed by individually designing the plurality of entity design elements, an intermediate variable for design of the object to be designed may be shared in design of a plurality of entity design elements, i.e., an intermediate variable determined for one entity design element may be used for design of another entity design element. Accordingly, depending on the order of designing the entity design elements, an intermediate variable obtained as a design result of a first entity design element may become a design condition of a second entity design element that is designed earlier than the first entity design element, thereby requiring rework in designing the object to be designed.

Further, some design variables are used in design of a plurality of entity design elements. Such design variables need to be used in a unified manner in design of the object to be designed. Accordingly, in a case where such design variables are determined in design of each of the entity design elements, a unifying process is additionally required. This may require rework in design of the object to be designed.

In view of this, according to the arrangement, the order of determining the important design variables is also determined in consideration of dependency of the intermediate variables among the entity design elements when the design order of the entity design elements is determined. This makes it possible to make entire design of the object to be designed more efficient as compared with a case where only the dependency of the intermediate variables among the entity design elements is considered. That is, it is possible to produce an effect that an efficient design workflow can be constructed in consideration of entire design.

In order to attain the above object, a design workflow construction apparatus of the present invention for supporting design of an object to be designed constituted by a plurality of entity design elements by individually designing the plurality of entity design elements is arranged such that: in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises: evaluation approach construction means for (i) acquiring a constraint formula for each of the plurality of entity design elements and (ii) generating an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and design workflow construction means for (i) acquiring design order information indicative of a design order of the plurality of entity design elements, (ii) creating, in accordance with the design order information, a design workflow in which the design order of the plurality of entity design elements is specified, and (iii) associating the evaluation formula generated by the evaluation approach construction means with each of the plurality of entity design elements in the design workflow.

Further, a design workflow construction method of the present invention for a design workflow construction apparatus for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of: (a) causing evaluation approach construction means of the design workflow construction apparatus to (i) acquire a constraint formula for each of the plurality of entity design elements and (ii) generate an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and (b) causing design workflow construction means of the design workflow construction apparatus to (i) acquire design order information indicative of a design order of the plurality of entity design elements, (ii) create, in accordance with the design order information, a design workflow in which the design order of the plurality of entity design elements is specified, and (iii) associate the evaluation formula generated in the step (a) with each of the plurality of entity design elements in the design workflow.

According to the arrangement, first, a constraint formula is acquired for each of the plurality of entity design elements, the constraint formula expressing an intermediate variable obtained as a design result of the entity design element by using, as variables, only the input variables, the design variables, and intermediate variables obtained as a design result of a sub-entity design element constituting the entity design element. Then, an evaluation formula for the entity design element is generated with use of the constraint formula, the evaluation formula expressing the intermediate variable obtained as the design result of the entity design element by using, as variables, only the input variables, the design variables, and intermediate variables obtained as a design result of another entity design element. That is, intermediate variables rewritten in an identical entity design element are all rewritten into expression using the input variables and the design variables. Then, a design workflow in which the design order of the entity design elements is specified in accordance with the design order information indicative of the design order of the entity design elements is created, and the evaluation formula is associated with each of the entity design elements in the design workflow.

This makes it possible to achieve consistency between the design order information and the evaluation formula in the design workflow, thereby producing an effect that a design workflow can be naturally constructed. That is, it is possible to produce an effect that an efficient design workflow can be constructed in consideration of the entire design.

In order to attain the above object, a design system of the present invention for supporting design of an object to be designed constituted by a plurality of entity design elements by individually designing the plurality of entity design elements, has a function of acquiring a design specification of the object to be designed and an evaluation index for evaluating a value of the object to be designed in the design specification; a function of acquiring profile data of the object to be designed; a function of extracting the entity design elements from the profile data and prioritizing the entity design elements so as to construct a design workflow; a function of associating, with the design workflow thus constructed, an evaluation approach for performance/evaluation of a design result of each of the entity design elements; a function of finding an appropriate solution by performing automatic optimization while evaluating the design result with use of the evaluation index in accordance with the design workflow with which the evaluation approach is associated; and a function of outputting the appropriate solution thus found.

Further, a design method of the present invention for supporting design of an object to be designed constituted by a plurality of entity design elements by individually designing the plurality of entity design elements, includes the steps of: causing a design workflow construction apparatus constituting the design system to acquire a design specification of the object to be designed and an evaluation index for evaluating a value of the object to be designed in the design specification; causing the design workflow construction apparatus to acquire profile data of the object to be designed; causing the design workflow construction apparatus to extract the entity design elements from the profile data and prioritize the entity design elements so as to construct a design workflow; causing the design workflow construction apparatus to associate, with the design workflow thus constructed, an evaluation approach for performance/evaluation of a design result of each of the entity design elements; causing the design workflow construction apparatus to find an appropriate solution by performing automatic optimization while evaluating the design result with use of the evaluation index in accordance with the design workflow with which the evaluation approach is associated; and causing the design workflow construction apparatus to output the appropriate solution thus found.

The arrangement allows the following series of functions to systematically collaborate: "(i) definition of design specification and evaluation index", "(ii) definition of profile of object to be designed", "(iii) data flow structure", "(iv) function/performance evaluation of object to be designed", "(v) process automation/solution search", and "(vi) output of design result".

By thus causing the systems engineering techniques, which have been conventionally used independently, to collaborate with each other, it is possible to systematically design a system. That is, it is possible to produce an effect that an efficient design workflow can be constructed in consideration of the entire design.

Note that the design workflow construction apparatus can be realized by a computer. In this case, the scope of the present invention encompasses (i) a design workflow construction program for causing the computer to function as the means so that the design workflow construction apparatus can be realized by the computer and (ii) a computer readable recording medium in which the design workflow construction program is stored.

Advantageous Effects of Invention

As described above, a design workflow construction apparatus of the present invention includes specifying information acquisition means for acquiring entity design element specifying information for specifying the plurality of entity design elements and important design variable specifying information for specifying, as important design variables, part or all of the design variables; and design order determining means for determining an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

Further, a design workflow construction method of the present invention includes the steps of: causing design order determining means of the design workflow construction apparatus to acquire entity design element specifying information for specifying the plurality of entity design elements and important design variable specifying information for specifying, as important design variables, part or all of the design variables; and causing the design order determining means to determine an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

The order of determining the important design variables is also determined in consideration of dependency of the intermediate variables among the entity design elements when the design order of the entity design elements is determined. This makes it possible to make entire design of the object to be designed more efficient as compared with a case where only the dependency of the intermediate variables among the entity design elements is considered. That is, it is possible to produce an effect that an efficient design workflow can be constructed in consideration of entire design.

A design workflow construction apparatus of the present invention includes evaluation approach construction means for (i) acquiring a constraint formula for each of the plurality of entity design elements and (ii) generating an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and design workflow construction means for (i) acquiring design order information indicative of a design order of the plurality of entity design elements, (ii) creating, in accordance with the design order information, a design workflow in which the design order of the plurality of entity design elements is specified, and (iii) associating the evaluation formula generated by the evaluation approach construction means with each of the plurality of entity design elements in the design workflow.

Further, a design workflow construction method of the present invention includes the steps of: (a) causing evaluation approach construction means of the design workflow construction apparatus to (i) acquire a constraint formula for each of the plurality of entity design elements and (ii) generate an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and (b) causing design workflow construction means of the design workflow construction apparatus to (i) acquire design order information indicative of a design order of the plurality of entity design elements, (ii) create, in accordance with the design order information, a design workflow in which the design order of the plurality of entity design elements is specified, and (iii) associate the evaluation formula generated in the step (a) with each of the plurality of entity design elements in the design workflow.

This makes it possible to achieve consistency between the design order information and the evaluation formula in the design workflow, thereby producing an effect that a design workflow can be naturally constructed. That is, it is possible to produce an effect that an efficient design workflow can be constructed in consideration of the entire design.

In order to attain the above object, a design system of the present invention for supporting design of an object to be designed constituted by a plurality of entity design elements by individually designing the plurality of entity design elements, includes a function of acquiring a design specification of the object to be designed and an evaluation index for evaluating a value of the object to be designed in the design specification; a function of acquiring profile data of the object to be designed; a function of extracting the entity design elements from the profile data and prioritizing the entity design elements so as to construct a design workflow; a function of associating, with the design workflow thus constructed, an evaluation approach for performance/evaluation of a design result of each of the entity design elements; a function of finding an appropriate solution by performing automatic optimization while evaluating the design result with use of the evaluation index in accordance with the design workflow with which the evaluation approach is associated; and a function of outputting the appropriate solution thus found.

Further, a design method of the present invention for a design system for supporting design of an object to be designed constituted by a plurality of entity design elements by individually designing the plurality of entity design elements, includes the steps of: causing a design workflow construction apparatus constituting the design system to acquire a design specification of the object to be designed and an evaluation index for evaluating a value of the object to be designed in the design specification; causing the design workflow construction apparatus to acquire profile data of the object to be designed; causing the design workflow construction apparatus to extract the entity design elements from the profile data and prioritize the entity design elements so as to construct a design workflow; causing the design workflow construction apparatus to associate, with the design workflow thus constructed, an evaluation approach for performance/ evaluation of a design result of each of the entity design elements; causing the design workflow construction apparatus to find an appropriate solution by performing automatic optimization while evaluating the design result with use of the evaluation index in accordance with the design workflow with which the evaluation approach is associated; and causing the design workflow construction apparatus to output the appropriate solution thus found.

By thus causing the systems engineering techniques, which have been conventionally used independently, to collaborate with each other, it is possible to systematically design a system. That is, it is possible to produce an effect that an efficient design workflow can be constructed in consideration of the entire design.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 1 is a functional block diagram illustrating an outline of an arrangement of a design workflow construction apparatus of an embodiment of the present invention.

FIG. 2 is a conceptual view showing a flow of processes carried out by the design workflow construction apparatus and an automatic design apparatus shown in FIG. 1.

FIG. 3 is an explanatory view showing an outline of DSM used in the design workflow construction apparatus shown in FIG. 1.

FIG. 4 is an explanatory view showing an example of evaluation of an object to be designed by the design workflow construction apparatus and the automatic design apparatus shown in FIG. 1.

FIG. 5 is a flow chart showing processes carried out by the design workflow construction apparatus and the automatic design apparatus shown in FIG. 1.

FIG. 6 is an explanatory view showing an example of a dividing tree for dividing an object to be designed into sub-systems constituting the object to be designed out of definitions of a profile of the object to be designed set in the design workflow construction apparatus shown in FIG. 1.

FIG. 7

FIG. 7 is an explanatory view showing exemplary input variables of the object to be designed out of the definitions of the profile of the object to be designed set in the design workflow construction apparatus shown in FIG. 1.

FIG. 8

FIG. 8 is an explanatory view showing exemplary design variables of the object to be designed out of the definitions of the profile of the object to be designed set in the design workflow construction apparatus shown in FIG. 1.

FIG. 9

FIG. 9 is an explanatory view showing exemplary output variables of the object to be designed out of the definitions of the profile of the object to be designed set in the design workflow construction apparatus shown in FIG. 1.

FIG. 10

FIG. 10 is an explanatory view showing exemplary features of each sub-system out of the definitions of the profile of the object to be designed set in the design workflow construction apparatus shown in FIG. 1.

FIG. 11 is an explanatory view showing an exemplary structure of the features out of the definitions of the profile of the object to be designed set in the design workflow construction apparatus shown in FIG. 1.

FIG. 12 is an explanatory view showing an exemplary structure of the features out of the definitions of the profile of the object to be designed set in the design workflow construction apparatus shown in FIG. 1.

FIG. 13 is an explanatory view showing an exemplary structure of the features out of the definitions of the profile of the object to be designed set in the design workflow construction apparatus shown in FIG. 1.

FIG. 14 is an explanatory view showing an exemplary structure of the features out of the definitions of the profile of the object to be designed set in the design workflow construction apparatus shown in FIG. 1.

FIG. 15 is an explanatory view showing an exemplary structure of the features out of the definitions of the profile of the object to be designed set in the design workflow construction apparatus shown in FIG. 1.

FIG. 16

FIG. 16 is an explanatory view showing an exemplary constraint formula among the features out of the definitions of the profile of the object to be designed set in the design workflow construction apparatus shown in FIG. 1. (a) of FIG. 16 shows "logic chip cost", and (b) of FIG. 16 shows "package area".

FIG. 17 is an explanatory view showing an example of how the order of the design elements (entity design elements+ important design variables) is determined by the design workflow construction apparatus shown in FIG. 1.

FIG. 18 is an explanatory view showing an example of how the order of the design elements (entity design elements+ important design variables) is determined by the design workflow construction apparatus shown in FIG. 1.

FIG. 19 is an explanatory view showing an exemplary design workflow that is created by the design workflow construction apparatus shown in FIG. 1 and that is executed by the automatic design apparatus.

FIG. 20

FIG. 20 is an explanatory view explaining functions of conventional software for automation and optimization of system design. (a) of FIG. 20 shows automation of repeated operations of simulation, and (b) of FIG. 20 shows optimization.

DESCRIPTION OF EMBODIMENTS

An embodiment of the present invention is described below with reference to FIGS. 1 through 19.

[A] Principle of Invention

Figure 1:
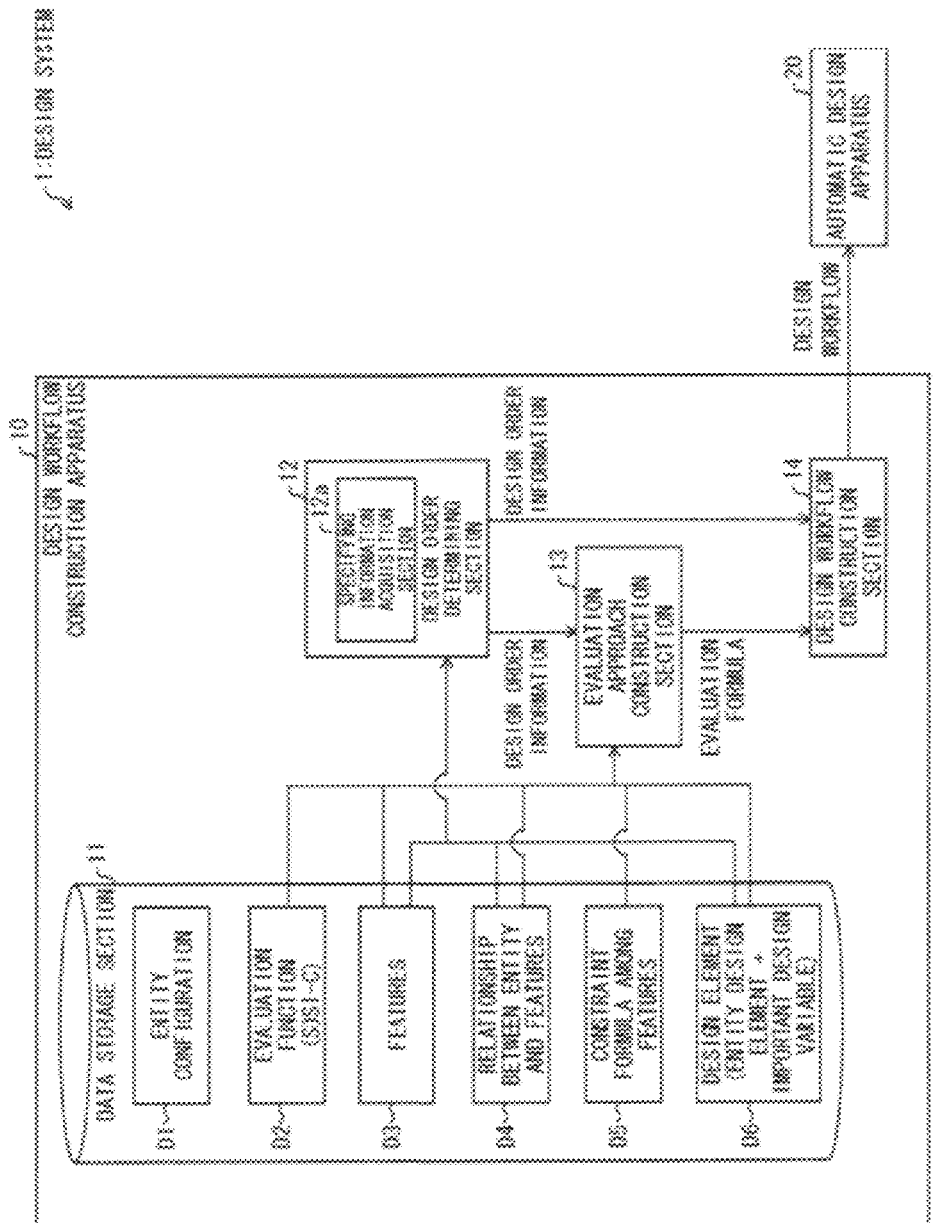
FIG. 1

As shown in FIG. 1, a design system 1 of the present embodiment includes a design workflow construction apparatus 10 and an automatic design apparatus 20. The design system 1 realizes a design approach based on an SDSI-Cubic (System Design & System Integration-Cubic) structure. Note that the SDSI-Cubic structure was produced by the inventors of the present invention.

The design approach based on the SDSI-Cubic structure is a technique for systematically constructing a design process (design workflow) by combining the following four techniques: definition of a profile of a product system which is an object to be designed, a data flow structure, performance/evaluation of the object to be designed, and automation/solution search technique. Collaboration of these four techniques makes it possible to automatically construct an evaluation approach and define entity design elements on the basis of definition of the object to be designed and definition of an evaluation system for the object to be designed. The automatic construction of the evaluation approach and the definition of the entity design elements are necessary for optimization of the object to be designed. The design approach based on the SDSI-Cubic structure is easy to understand when it is regarded as a cubic structure with six faces which respectively represent the above four techniques and the following two techniques: (i) a technique of inputting an evaluation index SDSI-C for evaluating a value of a system in a design specification and use of the evaluation specification and (vi) a technique of outputting a design result.

Use of such a design approach based on the SDSI-Cubic structure makes it possible to evaluate feedback and conflict on the basis of data flow between entity design elements (design tasks) described in definition of an evaluation system, thereby allowing a systematic construction of an appropriate design flow. Thus, a design workflow provided with an automation/solution search technique can be determined. In the present embodiment, the entity design elements are constituted by part of sub-systems constituting the object to be designed and part or all of design variables, as described later.

Figure 2:
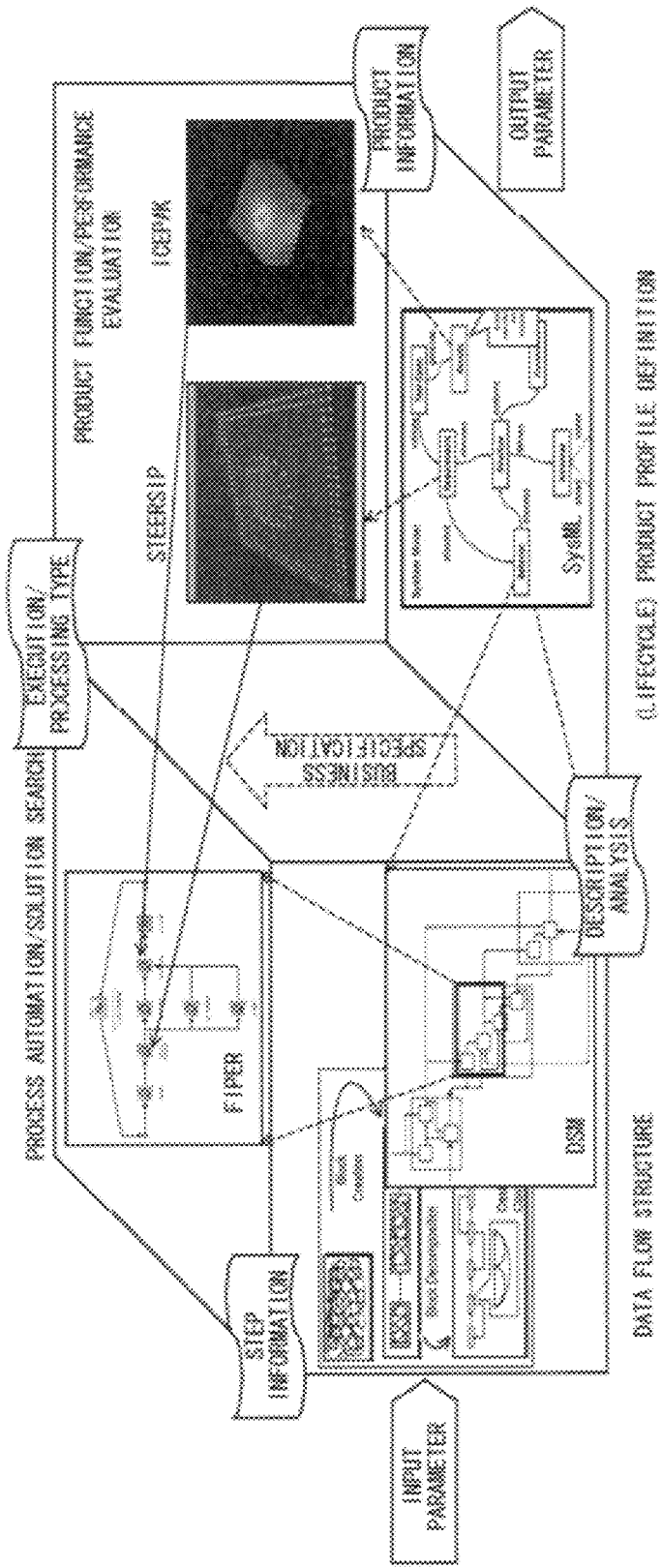
FIG. 2

FIG. 2 is a conceptual diagram showing a flow of processes carried out by the design workflow construction apparatus 10 and the automatic design apparatus 20 of the design system 1.

A procedure of the design approach based on the SDSI-Cubic structure is briefly described below. First, when an evaluation index (SDSI-C) for evaluating a design specification and a value of an object to be designed in the design specification is inputted on the "(i) definition of design specification and SDSI-C" face, a product profile of the object to be designed is defined based on the evaluation index on the "(ii) definition of profile of object to be designed" face. Next, on the "(iii) data flow structure" face, design elements (entity design elements or (entity design elements+important design variables)) are extracted from the product profile, a design flow is organized, and the design elements are prioritized so that an efficient data flow structure is constructed. In parallel with this, the entity design elements are transferred from the "(ii) definition of profile of object to be designed" face to the "(iv) function/performance evaluation of object to be designed" face, and on the "function/performance evaluation of object to be designed" face, an evaluation approach for performance/evaluation of the design result of each of the entity design elements in accordance with a design workflow is constructed. Next, the design workflow is created based on a design order created on the "(iii) data flow structure" face and the evaluation approach for each of the entity design elements which is created on the "(iv) function/performance evaluation of object to be designed" face, and then the design workflow thus created is transferred to the "(v) process automation/solution search" face. On the "(v) process automation/solution search" face, automatic optimization is performed in accordance with the design workflow while evaluating the design result with the use of the SDSI-C, and thus an appropriate solution is obtained. Finally, on the "(vi) output of design result" face, the design result is outputted.

In this way, in the design approach based on the SDSI-Cubic structure, the series of functions, i.e., "(i) definition of design specification and SDSI-C", "(ii) definition of profile of object to be designed", "(iii) data flow structure", "(iv) function/performance evaluation of object to be designed", "(v) process automation/solution search", and "(vi) output of design result" systematically collaborate with each other.

In the design system 1 shown in FIG. 1, the design workflow construction apparatus 10 carries out the processes "(i) definition of evaluation index SDSI-C", "(ii) definition of profile of object to be designed (product)", "(iii) data flow structure", and "(iv) function/performance evaluation of object to be designed (product)". Thus, the design workflow construction apparatus 10 construct a design workflow for the object to be designed. Then, the automatic design apparatus 20 carries out the processes "(v) process automation/solution search" and "(vi) output of design result" in accordance with the design workflow constructed by the design workflow construction apparatus 10.

FIG. 2 shows examples of tools that are in charge of respective processes. Specifically, SYSML can be used for the "definition of profile of object to be designed" face. Further, DSM can be used for the "data flow structure" face. Further, STEERSIP (product name of Keirex Technology inc.) and ICEPAC (product name of ANSYS, Inc.) can be used for the "evaluation of product function/performance of object to be designed" face. Further, FIPER (product name of Engineous Japan, Inc.) can be used for the "process automation/solution search" face.

Note that SYSML, DSM, STEERSIP, ICEPAC, and FIPER are known techniques, and tools having similar functions can be appropriately selected and used.

Figure 3:
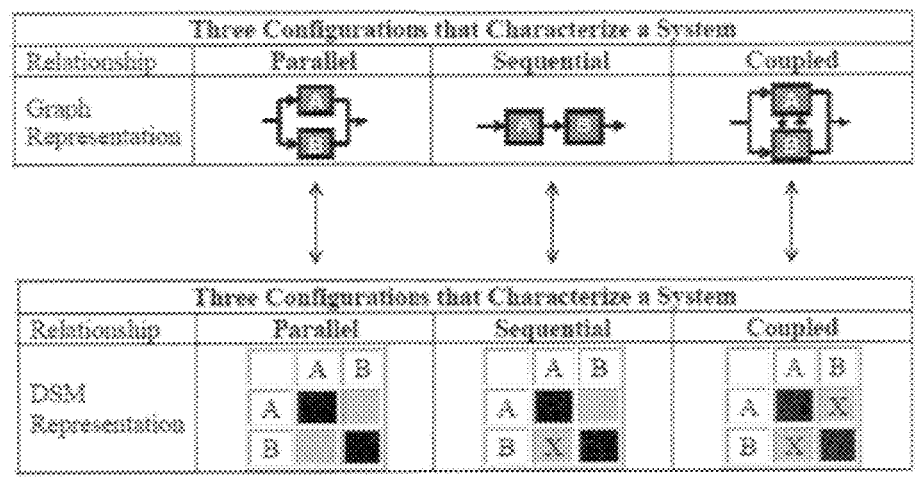
FIG. 3

DSM extracts design elements (in the present embodiment, entity design elements or (entity design elements+important design variables)) on the basis of information of the object to be designed that has been defined, organizes dependency among design tasks on the basis of constraints among functions, and determines an appropriate design flow. Note that DSM organizes dependency among the design tasks by changing a relationship between the design tasks from graph representation to DSM representation, as shown in FIG. 3.

STEERSIP is CAD software for 3DSiP.

ICEPAK is CAE software for thermal flow of an electronic circuit.

FIPER is software for distributed automatic optimization.

In the design approach based on the SDSI-Cubic structure, SDSI-C is used as an evaluation index for the object to be designed. The SDSI-C (System Design & System Integration Coefficient) is an index for evaluating overall performance of a system.

Use of the SDSI-C allows the four techniques, i.e., definition of the profile of the object to be designed, the data flow structure, performance/evaluation of the object to be designed, and the automation/solution search technique to be combined as a design framework for organizing relationships among sub-systems, functions, and constraints. Through such a design framework created based on the SDSI-Cubic, not only information of the object to be designed, but also processes for designing the object to be designed can be grasped. This allows for consideration of the processes for designing the object to be designed and automatic search of an appropriate solution.

The definition of the profile of the object to be designed can be systematically constructed with the use of a dividing tree for dividing the object to be designed into sub-systems, a table of features (parameters) of the sub-systems, a sheet of constraint formulas among the parameters, etc. Accordingly, by changing the dividing tree, the features, and the constraint formulas depending on a specification of the object to be designed, it is possible to reconstruct the design workflow construction apparatus 10 and the automatic design apparatus 20. Thus, re-optimization of the object to be designed can be easily executed.

Figure 4:
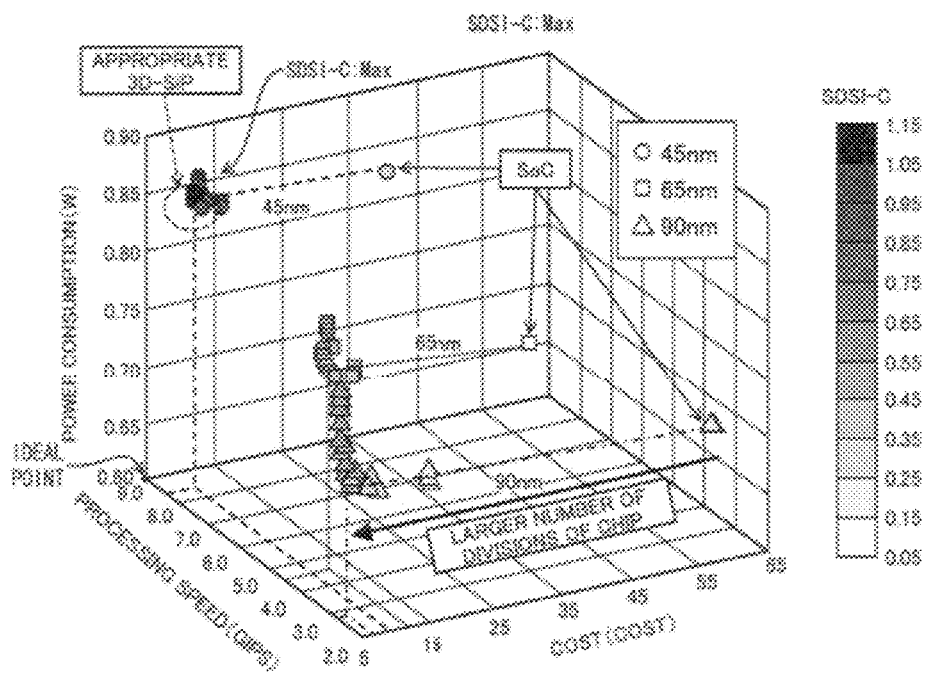
FIG. 4

FIG. 4 shows an example in which the object to be designed is a semiconductor device. As shows in FIG. 4, use of SDSI-C that is defined as later described allows an appropriate 3D-SiP to be designed so that the SDSI-C becomes maximum.

Characteristics of the design approach based on the SDSI-Cubic structure are described below in more detail.

(1) The system design & system integration (SDSI) is narrowed down to four quadrants separated by two coordinate axes: a symmetrical axis (product information, step information) and a functional axis (description/analysis, execution process).

(2) Out of the four quadrants mentioned in (1), a quadrant whose symmetrical axis is product information and whose functional axis is description/analysis is defined as "definition of profile of object to be designed", a quadrant whose symmetrical axis is product information and whose functional axis is execution process is defined as "product function/product evaluation", a quadrant whose symmetrical axis is step information and whose functional axis is description/analysis is defined as "design/data flow structure", and a quadrant whose symmetrical axis is step information and whose functional axis is execution process is defined as "process automation/solution search".

(3) An evaluation index (SDSI-C) integrating natural scientific evaluation and social scientific evaluation is used for a multipurpose evaluation function for the object to be designed.

(4) The techniques corresponding to the four quadrants defined in (2) collaborate with each other so that a design model becomes more detailed. Thus, the design approach based on the SDSI-Cubic structure is a highly efficient design approach.

(5) In order to attain a highly efficient design approach as described in (4), the process is shifted from "definition of profile of object to be designed" to "design/data flow structure". In "design/data flow structure", entities and attribute values which influence an entire system and which coexist with the entities are extracted as design elements instead of conventional entity design elements that are based on only entities and attribute values. This allows for design taking into consideration contradictory relationships between attribute values of entities. Consequently, it becomes possible to construct an appropriate design process in "process automation/solution search".

(6) In order to attain a highly efficient design approach as described in (4), the process is shifted from "definition of profile of object to be designed" to "product function/product evaluation". In order to shift the process from "definition of profile of object to be designed" to "product function/product evaluation", a product function/product evaluation approach (function/evaluation approach for the object to be designed) for each of the design elements used in "design/data flow structure" is constructed instead of a conventional product function/product evaluation approach for merely finding evaluation values. This makes it possible to construct an appropriate design process in "process automation/solution search".

As described above, when a person conceives/designs/creates a new product system, the design approach based on the SDSI-Cubic structure makes it possible to convert social and economical effects brought about by the new technique/new method into an objective numerical value expressed by an evaluation index (SDSI-C), to systematically evaluate the numerical value, and to obtain an optimum solution which maximizes the numerical value, i.e., an optimum solution which maximizes a value of the new technique/new method. This produces immeasurable effects. For example, in the field of a semiconductor device, which is said to be approaching a limit of microfabrication and an economical limit, use of SDSI-C revealed that an effect produced by integration in a three-dimensional space is ten or more times larger than that produced by conventional integration on a two-dimensional plane (2D-SoC). Further, in the field of display, an effect that is one hundred or more times larger than a conventional one can be expected as a result of evaluation of possibility of a new technique/new method.

As described above, when a person designs a system, the design approach based on the SDSI-Cubic structure allows for earlier judgment of possibility of innovation, as compared with conventional arts. Accordingly, this approach has a possibility of achieving a remarkable increase in competitiveness in cutting-edge areas which Japan aims as a country depending on science and technology, and creating new businesses one after another. Therefore, effects on society, companies, research institutes, etc. are immeasurable.

[B] Exemplary Arrangement of Design Workflow Construction Apparatus

The following describes the design system 1 and the design workflow construction apparatus 10 of the present embodiment in detail. Note that the following description deals with an example in which the object to be designed is a semiconductor device. However, an object to which the design workflow construction apparatus 10 is applied is not limited to a semiconductor device. The design workflow construction apparatus 10 can be applied not only to an object, such as a semiconductor device, which has a physical entity configuration, but also to an object, such as software, which has no physical entity but has a logical entity configuration.

Further, as to the "(iii) data flow structure" function, the following description deals with an example (design order determining section 12) in which a data flow structure is constructed by processing design elements (entity design elements+important design variables) with the use of DSM. However, the present embodiment is not limited to this. That is, the "(iii) data flow structure" function may be realized with the use of a method other than DSM. Further, as to the "(iv) function/performance evaluation of object to be designed" function, the following description deals with an example (evaluation approach construction section 13) in which an evaluation approach for performance/evaluation of a design result for each of the entity design elements in accordance with a design workflow is constructed. However, the present embodiment is not limited to this. That is, the "(iv) function/performance evaluation of object to be designed" function may be realized with the use of a method other than the above method.

A design specification of "next-generation 3D-SiP" which is used as a specific example of an object to be designed is as follows.

[Business]
Business domain: Device for mobile phone
Years in business: Five years
Production number: Ten thousand to one million per month
Semiconductor Production Line: Shared by other products and operated in full production
Mounting Line: Only for product
[Device Specification]
Performance: 2.5GPIS (DRAM 1 GByte)
Cost: Undecided
Power Consumption: 1 W
Volume: Height 1.2 mm, Footprint 14 mm×14 mm
CPU-MEM transmission band: Determined based on performance and cache hit rate An evaluation index is defined by the following equation.

$$SDSI\text{-}C=[\text{performance}(GIPS)]/[\text{cost}\times\text{power consumption}(W)]$$

Note that the evaluation index may be defined by the following more detailed equation.

$$SDSI\text{-}C=\{[\text{performance}(GIPS)]/[\text{cost}\times\text{power consumption}(W)]\}\times\{[\text{the number of functions}]/[\text{spatial volume}\times\text{weight}]\}$$

In this way, the SDSI-C can be defined by an equation combining various evaluations. Of course, the SDSI-C needs to be defined in accordance with an object to be designed.

Figure 19:
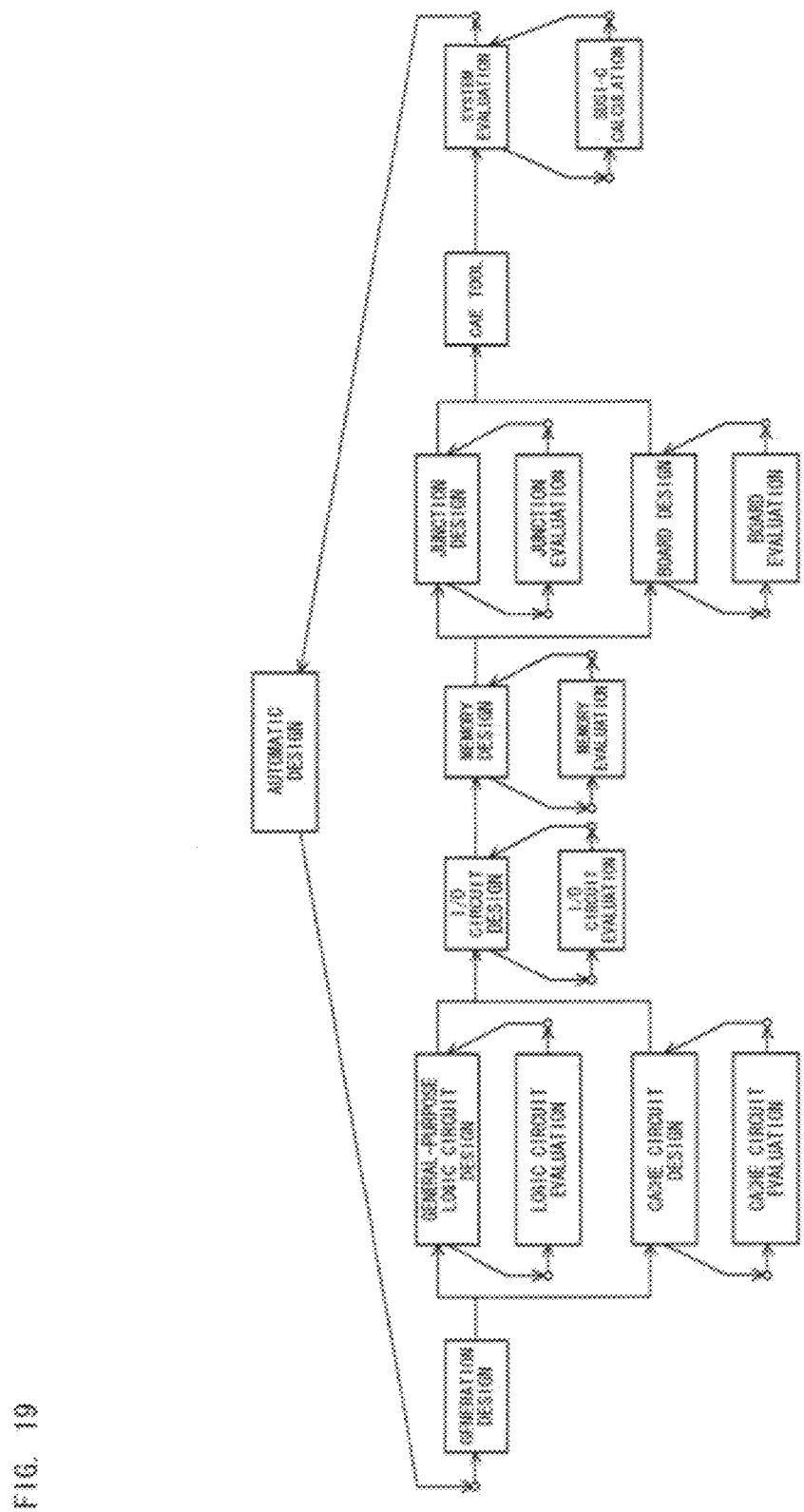
FIG. 19

FIG. 1 is a functional block diagram illustrating an outline of an arrangement of the design system 1 and the design workflow construction apparatus 10 of the present embodiment. FIG. 19 is an explanatory view showing an example of a design workflow that is created by the design workflow construction apparatus 10 and that is executed by the automatic design apparatus 20.

The automatic design apparatus 20 designs an object to be designed constituted by a plurality of entity design elements by individually designing the entity design elements in accordance with the design workflow (FIG. 19).

As shown in FIG. 19, in the design workflow used by the automatic design apparatus 20 of the design system 1, design steps for the design elements are connected according to a design order. Thus, the design order of the design elements is defined. In the present embodiment, the "design elements" include "entity design elements" and "important design variables". Therefore, accurately, in the design workflow, steps for designing the entity design elements and steps for designing the important design variables are connected according to the design order. The entity design elements are extracted from sub-systems constituting the object to be designed. The important design variables are extracted from design variables.

As described later, the extraction of the entity design elements is basically carried out as follows. Specifically, definitions (D1, FIG. 6) of entity configurations (profile data) of the object to be designed are divided so that the design workflow can be properly constructed and to such an extent that functions of the object to be designed which are obtained from definitions of features can be properly handled. Then, a user selects the entity design elements from the definitions thus divided. Information (entity design element specifying information) for specifying the entity design elements thus extracted may be stored in a data storage section 11 and be read out appropriately. Further, the important design variables are basically extracted as follows. Specifically, a user selects the important design variables from definitions (D3, FIGS. 11 through 15) of the features (profile data) of the object to be designed. Information (important design variable specifying information) for specifying the important design variables thus extracted may be stored in the data storage section 11 and be read out appropriately. The design workflow construction apparatus 10 may have a function of presenting, to a user, acquired definitions (D1, FIG. 6) of the entity configurations of the object to be designed so that the user can select the entity design elements. Further, the design workflow construction apparatus 10 may have a function of presenting, to a user, acquired definitions (D3, FIGS. 11 through 15) of the features of the object to be designed so that the user can select the important design variables.

As shown in FIG. 19, in the design workflow, a design step for each of the entity design elements is associated with an evaluation step for evaluating the entity design element designed in the design step. In each evaluation step, an evaluation formula used for evaluation in the evaluation step is determined in advance. Note that a feature of the present invention lines in how a design workflow is created, and therefore a structure itself is similar to a conventional one. Further, functions of the automatic design apparatus 20, i.e., a function of finding solutions of the entity design elements in accordance with the design workflow and a function of outputting a design result can be realized by a conventional technique, and therefore the following describes only an outline of the feature of the present invention.

The automatic design apparatus 20 designs and evaluates each of the entity design elements with the use of the design workflow as described above. For example, the design workflow of FIG. 19 is defined such that an I/O circuit is designed by repeatedly carrying out I/O circuit design and I/O circuit evaluation. Since a general-purpose logic circuit and a cache circuit are designed concurrently, the design workflow of FIG. 19 is defined such that general-purpose logic circuit design and cache circuit design are performed concurrently, and general-purpose logic circuit evaluation and cache circuit evaluation are performed concurrently.

More specifically, in design of the object to be designed, the automatic design apparatus 20 uses input variables that are given in advance in designing the object to be designed, design variables that are determined in designing the entity design elements, and intermediate variables that are uniquely determined when the input variables and the design variables are determined. Further, in design of the entity design elements, the automatic design apparatus 20 uses, as a design condition, at least part of a variable group constituted by the input variables, the design variables, and the intermediate variables, and determines, as a design result, intermediate variables that are not used as the design condition.

Accordingly, the design workflow defines instructions given to the automatic design apparatus 20 such as an instruction to secure a region in which data such as the input variables, design variables, and intermediate variables are stored and an instruction to refer to the data when design and evaluation are carried out. Especially, the design workflow is defined such that the automatic design apparatus 20 can acquire values of intermediate variables determined as a design condition in an evaluation formula of a first entity design element with reference to values of intermediate variables obtained as a design result of a second entity design element that is design earlier than the first entity design element. Note that the region in which the data such as the input variables, design variables, and intermediate variables are stored may be acquired by the automatic design apparatus 20 or may be allocated in advance in the design workflow itself.

In the design system 1, such a design workflow is created by the design workflow construction apparatus 10. The following describes the design workflow construction apparatus 10 in detail.

As shown in FIG. 1, the design workflow construction apparatus 10 includes the data storage section 11, a design order determining section 12, an evaluation approach construction section 13, and a design workflow construction section 14.

The data storage section 11 stores, in advance, definitions (D1) of entity configurations of the object to be designed, definition (D2) of an evaluation function (SDSI-C) of the object to be designed, definitions (D3) of features of the object to be designed, definitions (D4) of relationships between entities and the features of the object to be designed, definitions (constraint formulas among features D5) of constraint formulas among the features of the object to be designed, and definitions (D6) of design elements of the object to be designed. In the present embodiment, these profile data are stored in advance in the data storage section 11, but a user may sequentially input these profile data. Details of these data are described later. Note that data supplied from the data storage section 11 to the design order determining section 12 and the evaluation approach construction section 13 are formulas and variable names for constructing a design workflow, and are not a result of calculation of the formulas nor values of the variables.

As described above, the definitions (D6) of the design elements are information (entity design element specifying information and important design variable specifying information) for specifying the entity design elements and the important design variables. The design workflow construction apparatus 10 acquires, from the data storage section 11, the definitions (D1, FIG. 6) of the entity configurations of the object to be designed and the definitions (D3, FIGS. 11 through 15) of the features of the object to be designed, and presents the definitions thus acquired to a user so that the user can select entity design elements and important design variables. Thus, the design workflow construction apparatus 10 generates definitions (D6; design element specifying information) of design elements, and then causes the definitions of the design elements to be stored in the data storage section 11.

The design order determining section 12 determines an order of design of the entity design elements so as to reduce the number of combinations of entity design elements in which an intermediate variable determined as a design condition of a first entity design element becomes an intermediate variable obtained as a design result of a second entity design element designed later than the first entity design element. Along with the order of design of the entity design elements, the design order determining section 12 also determines an order of determination of important design variables on the basis of the design element specifying information D6 that is acquired from the data storage section 11 by the specifying information acquisition section 12a.

The entity design elements are selected as follows. Specifically, the definitions of the entity configurations are divided to such an extent that functions of the object to be designed that are obtained from the definitions of the features of the object to be designed can be properly handled, and the entity design elements are selected from the definitions of the entity configurations thus divided so that a design workflow can be properly constructed. Information (entity design element specifying information) for specifying the entity design elements thus extracted is set as the design element specifying information D6.

The important design variables are design variables which greatly influence efficiency of design of the object to be designed or design variables on which the large number of entity design elements depend. Information (important design variable specifying information) specifying the important design variables is set as the design element specifying information D6. The important design variables may be specified by a user or may be specified in a manner such that the design workflow construction apparatus 10 automatically selects a design variable used as a design condition for the largest number of entity design elements. The important design variables may be part of or all of the design variables. Note, however, that in a case where the number of important design variables is too large, design issues are distilled into a single design issue in contraries. This causes an explosive increase in design space, thereby making design solution search inefficient. It is therefore necessary to appropriately adjust the number of important design variables.

The evaluation approach construction section 13 acquires, for each of the entity design elements, a constraint formula among features D5 (constraint formula) for expressing intermediate variables obtained as a design result of the entity design element, in which constraint formula only input variables, design variables, and intermediate variables obtained as a design result of sub-entity design elements constituting the entity design element are used as variables. Then, the evaluation approach construction section 13 creates, for each of the entity design elements with the use of the constraint formula among features D5, an evaluation formula expressing the intermediate variables obtained as a design result of the entity design element, in which evaluation formula only input variables, design variables, and intermediate variables obtained as a design result of another entity design element are used as variables.

Figure 6:
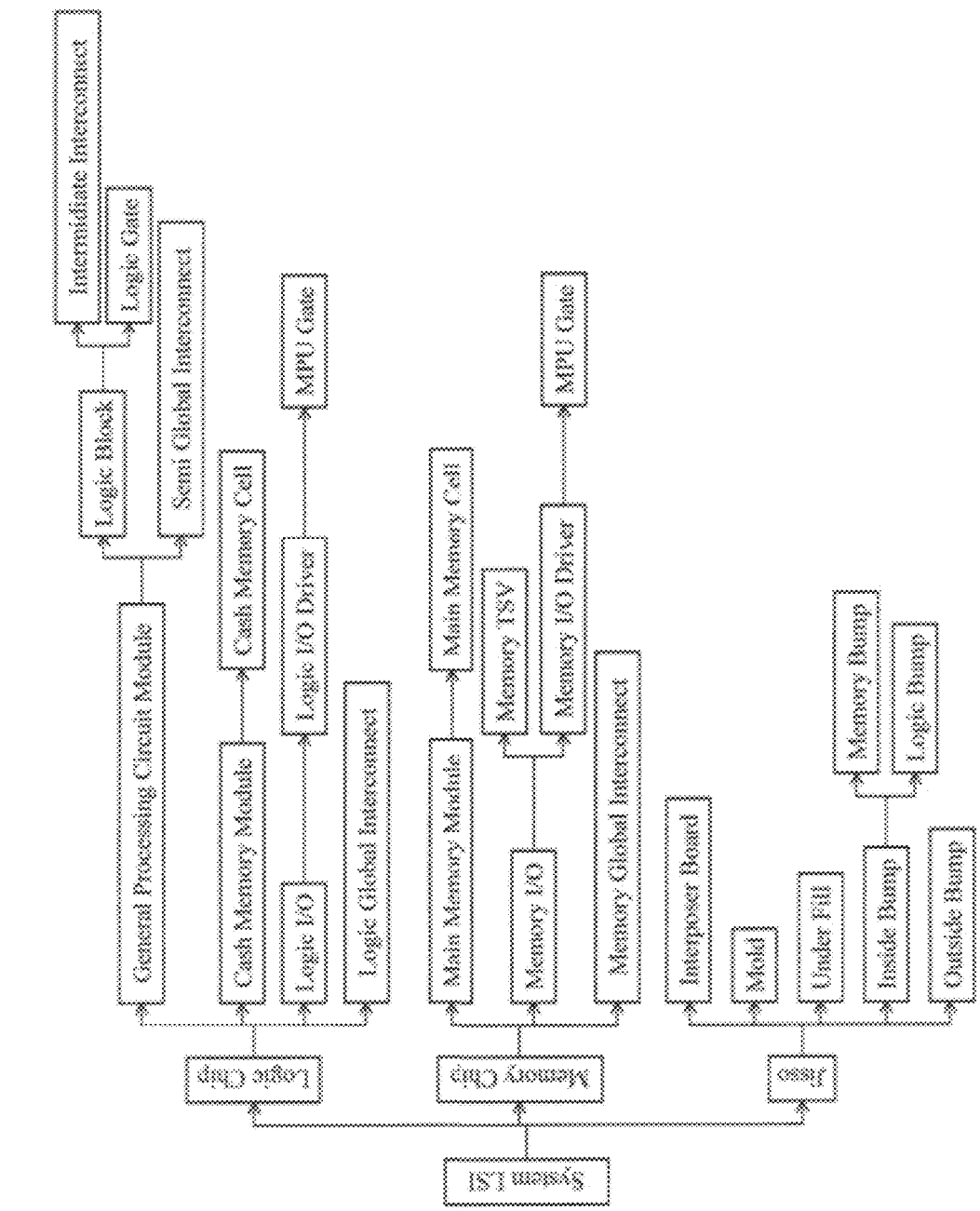
FIG. 6
Figure 11:
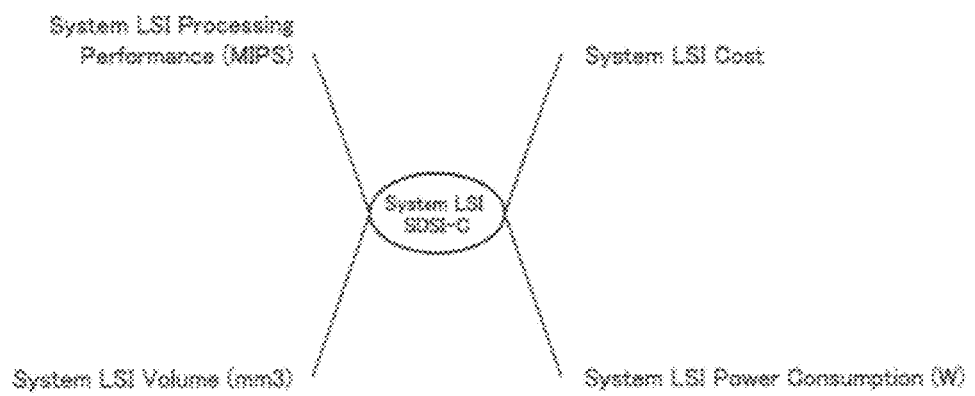
FIG. 11
Figure 12:
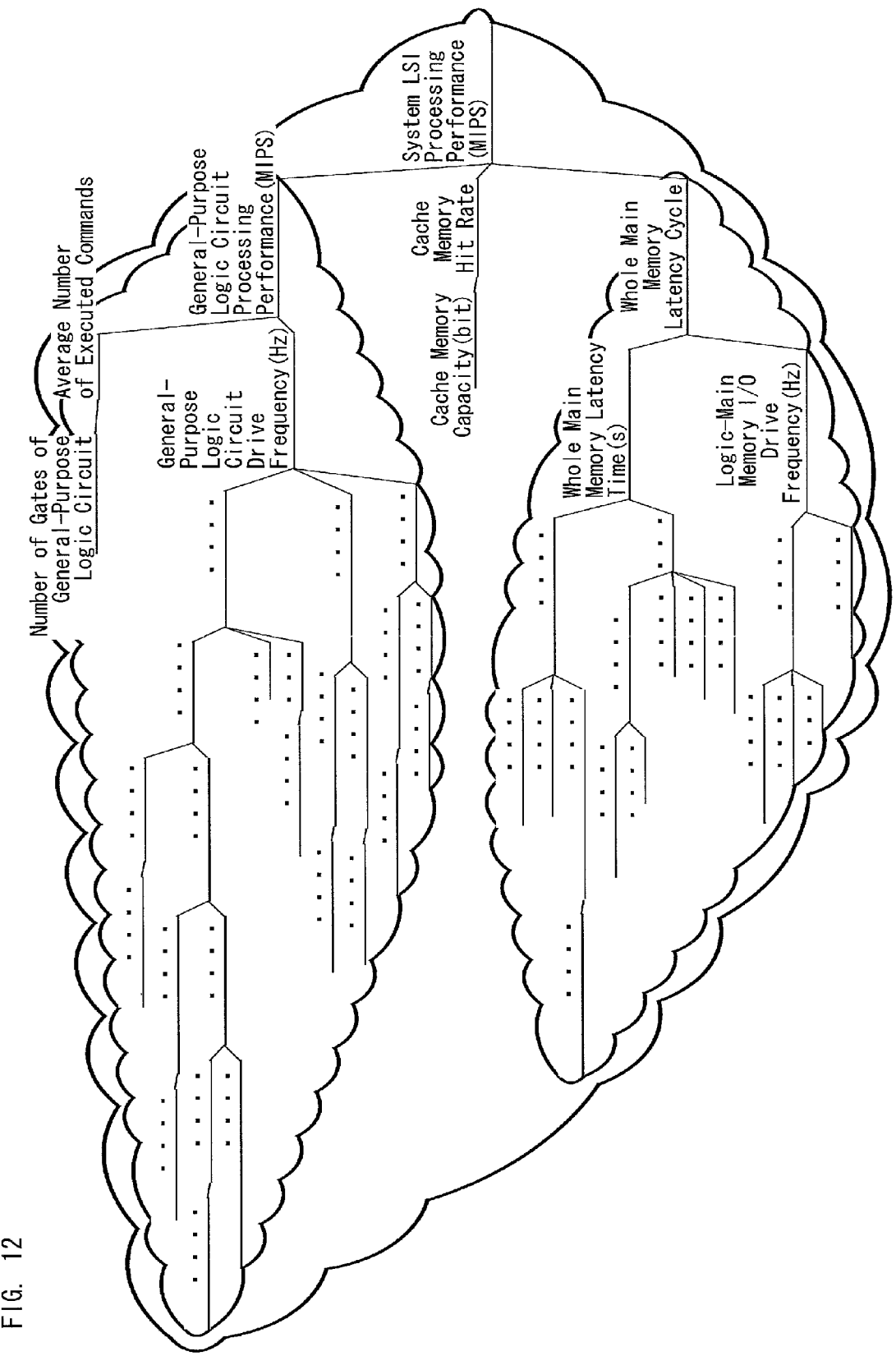
FIG. 12
Figure 13:
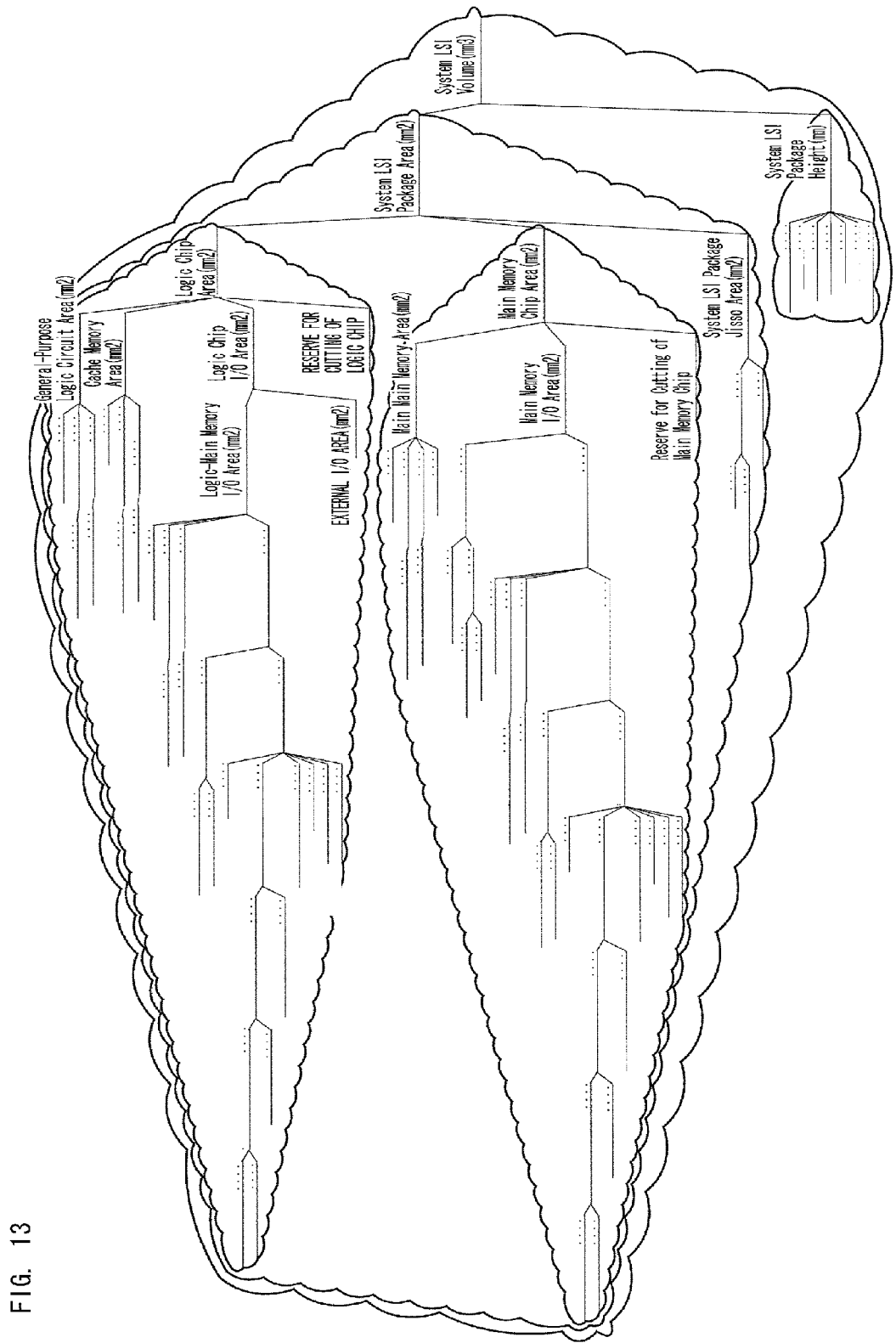
FIG. 13
Figure 14:
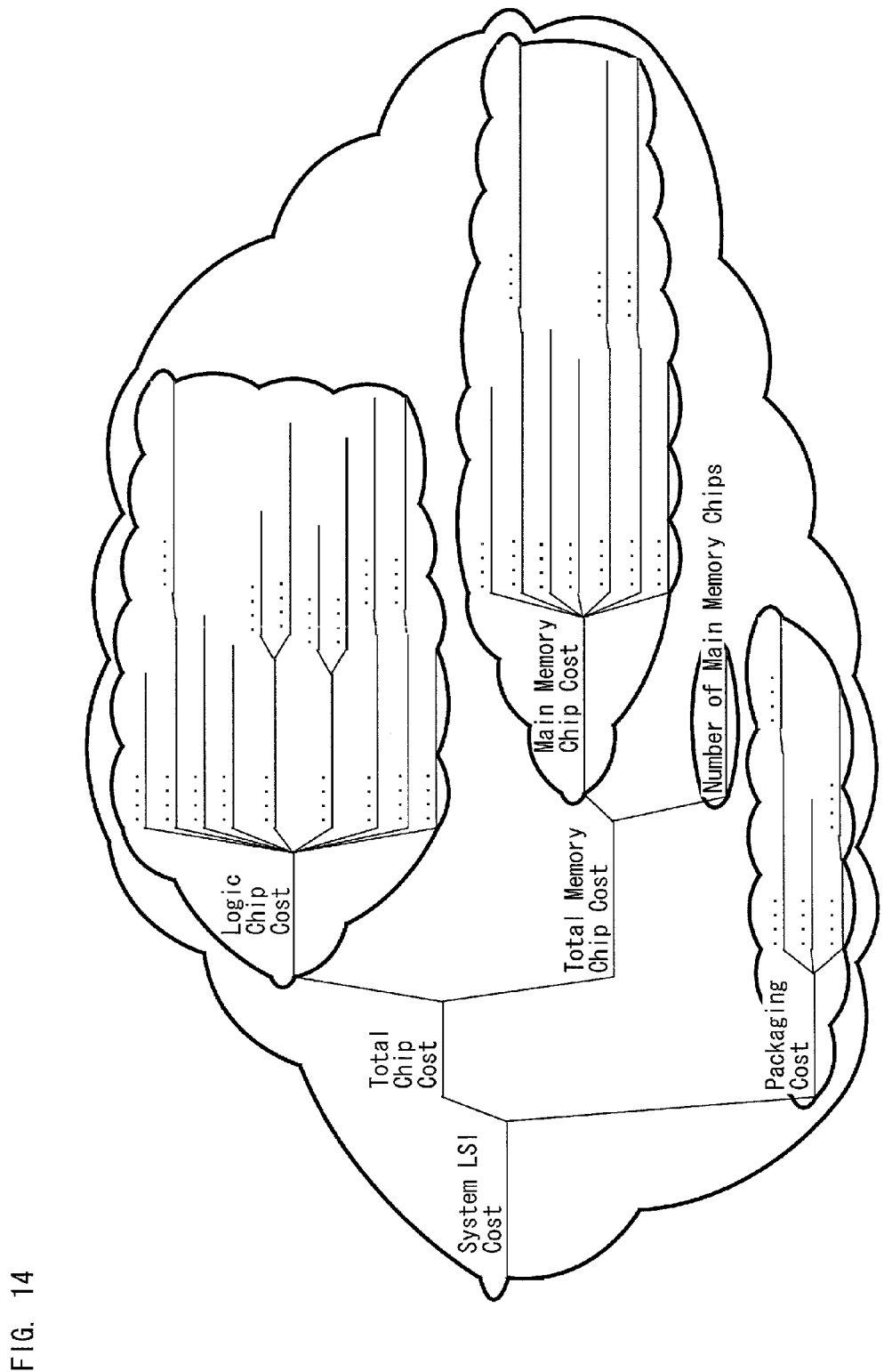
FIG. 14
Figure 15:
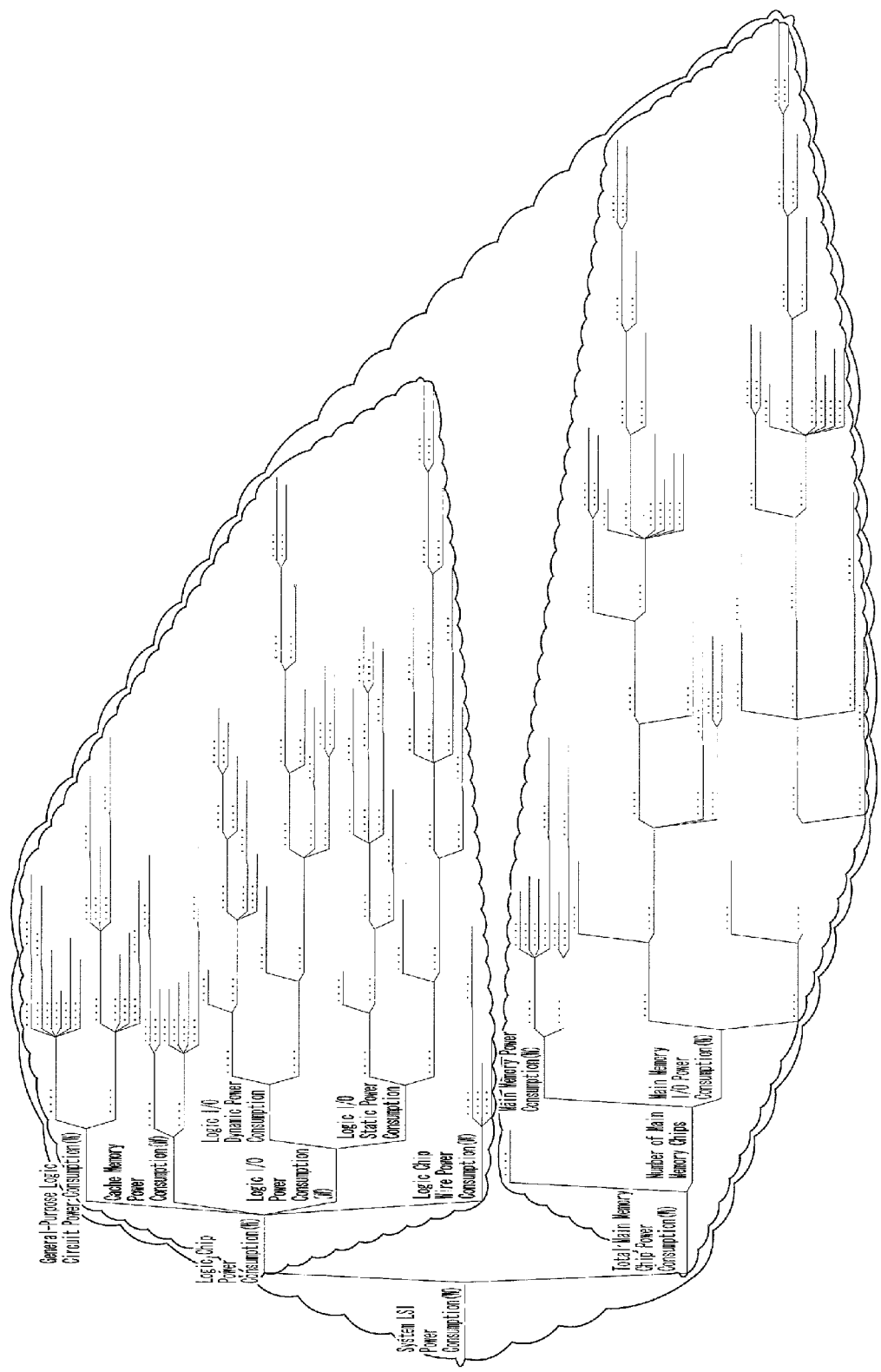
FIG. 15

FIG. 6 is an explanatory view illustrating an example of a dividing tree for dividing the object to be designed into subsystems constituting the object to be designed out of the definitions of the object to be designed (system LSI in the present embodiment) set in the design workflow construction apparatus 10. Specifically, as shown in FIG. 6, for example, the "system LSI" is constituted by sub-entity design elements: "logic chip", "memory chip", and "mounting (jisso)". Further, the "logic chip" is constituted by sub-entity design elements: "general processing circuit module", "cache memory module", "logic I/O", and "logic global interconnect". In this way, entities of the object to be designed have a tree-like structure constituted by the entity design elements. Note that a subordinate entity design element constituting an entity design element is hereinafter referred to as "sub-entity design element".

The design workflow construction section 14 acquires design order information indicative of a design order of the design elements, and generates a design workflow specifying the design order of the design elements in accordance with the design order information. Then, the design workflow construction section 14 associates an evaluation formula generated in the evaluation approach construction section 13 with each of the entity design elements out of the design elements on the design workflow.

Further, the design workflow construction section 14 constructs the design workflow so that values of intermediate variables determined as a design condition in an evaluation formula of a first entity design element can be acquired with reference to values of intermediate variables obtained as a design result of a second entity design element that is designed earlier than the first entity design element.

Figure 5:
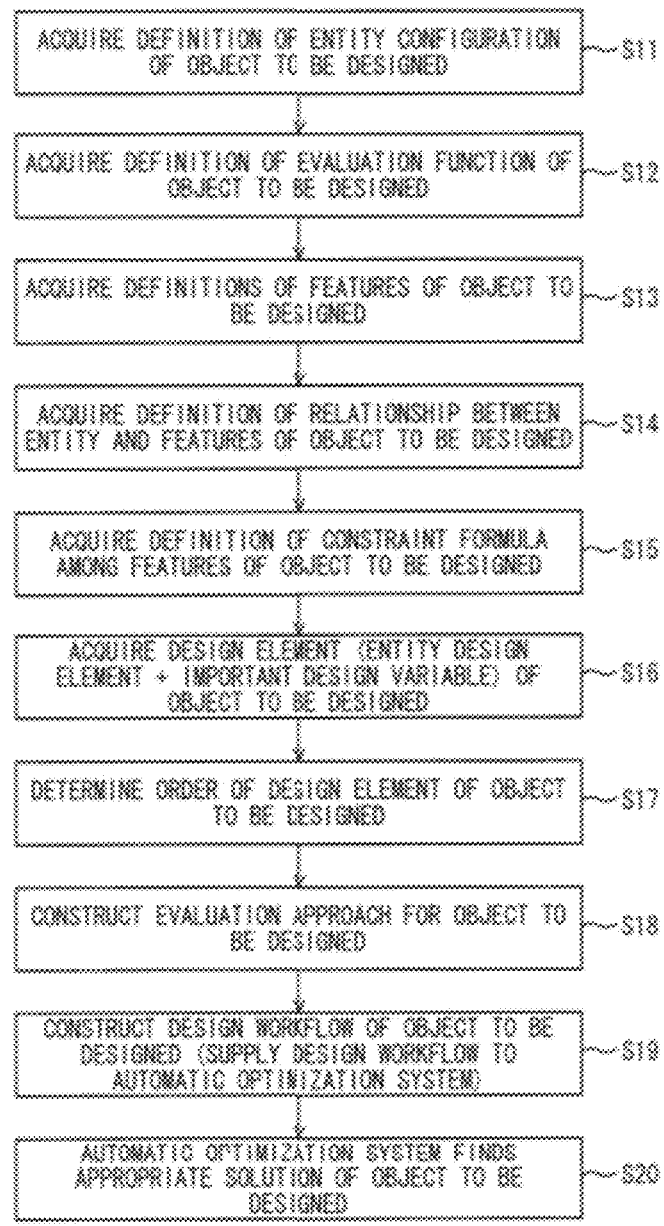
FIG. 5

Next, with reference to FIG. 5, the following describes a flow of processes carried out by the design workflow construction apparatus 10 and the automatic design apparatus 20. FIG. 5 is a flow chart showing a flow of processes carried out by the design workflow construction apparatus 10 and the automatic design apparatus 20. Note that the steps S11 through S19 are processes carried out by the design workflow construction apparatus 10 and the step S20 is a process carried out by the automatic design apparatus 20.

First, the design workflow construction apparatus 10 acquires definitions (FIG. 6) of the entity configurations of the object to be designed (S11). In the present embodiment, it is assumed that the definitions of the entity configurations are stored in advance in the data storage section 11 as entity configurations D1.

Next, the evaluation approach construction section 13 acquires, from the data storage section 11, definition (D2) of an evaluation function (SDSI-C) of the object to be designed (S12). As described above, in the present embodiment, it is assumed that the evaluation function D2 is expressed by the following equation:

$$\text{SDSI-C} = [\text{performance}(GIPS)/[\text{cost} \times \text{power consumption}(W)]]$$

Next, the evaluation approach construction section 13 acquires, from the data storage section 11, definitions (D3) of the features of the object to be designed (S13). The term "features" is a term used to collectively refer to input variables, design variables, intermediate variables, and output variables of the object to be designed. The input variables are given in advance when the object to be designed is designed. The design variables except the important design variables are determined when the entity design elements are designed. The intermediate variables are uniquely determined when the input variables and the design variables are determined. The output variables are uniquely determined when the input variables, the design variables, and the intermediate variables are determined.

FIG. 7 shows thirty-nine input variables used in the present embodiment, FIG. 8 shows four design variables used in the present embodiment, and FIG. 9 shows five output variables used in the present embodiment. The details of the intermediate variables are omitted since the number of intermediate variables is large (seventy-eight). Out of the design variables, "memory chip technology node" and "logic chip technology node" are handled as the same thing, and are therefore collectively described as "generation".

Next, the design order determining section 12 and the evaluation approach construction section 13 acquire, from the data storage section 11, definitions (D4) of relationships between the entities and the features of the object to be designed (S14).

FIG. 10 is an explanatory view showing exemplary features of the sub-systems out of the definitions of the profile of the object to be designed set in the design workflow construction apparatus 10. FIG. 10 corresponds to the dividing tree of the entities of the object to be designed (system LSI) shown in FIG. 6. For example, the third column from the left in FIG. 10 corresponds to entity design elements in the third class from the top ("system LSI") of FIG. 6. FIG. 10 shows features indicative of characteristics of each of the entity design elements.

Next, the design order determining section 12 acquires, from the data storage section 11, definitions (D5) of the constraint formulas among the features of the object to be designed (S15).

FIGS. 11 through 15 are explanatory views each showing an exemplary structure of the features out of the definitions of the profile of the object to be designed set in the design workflow construction apparatus 10. Although FIGS. 11 through 15 are separated from each other because of space limitations, FIGS. 11 through 15 show a single tree structure whose root is the evaluation function (SDSI-C). That is, "system LSI performance", "system LSI volume", "system LSI cost", and "system LSI power consumption" of FIG. 11 correspond to top nodes of FIGS. 12 through 15, respectively. FIGS. 11 through 15 show relationships among the input variables, the design variables, the intermediate variables, and the output variables.

(a) and (b) of FIG. 16 are explanatory views each showing an exemplary constraint formula among the features out of the definitions of the profile of the object to be designed set in the design workflow construction apparatus 10. In the present embodiment, forty-one formulas are defined as the constraint formulas D5 among the features. FIG. 16 shows two formulas out of the forty-one formulas. The constraint formulas D5 among the features are obtained from the relationships among the features shown in FIGS. 11 through 15. Accordingly, the remaining thirty-nine constraint formulas among the features are not shown since dependency among the variables can be grasped with reference to FIGS. 11 through 15.

Next, as described above, the design workflow construction apparatus 10 presents, to a user, the definitions (D1, FIG. 6) of the entity configurations of the object to be designed and the definitions (D3, FIGS. 11 through 15) of the features of the object to be designed that are acquired from the data storage section 11 so that the user can select entity design elements and important design variables. Thus, the design workflow construction apparatus 10 generates definitions (D6; design element specifying information) of the design elements, and causes the definitions of the design elements to be stored in the data storage section 11 (S16).

Next, the design order determining section 12 determines an order of designing the entity design elements and an order of determining the important design variables on the basis of the definitions (D3) of the features of the object to be designed, the definitions (D4) of the relationships between the entities and the features of the object to be designed, the definitions (constraint formula D5 among the features) of the constraint formulas among the features of the object to be designed, and the definitions (design element specifying information D6) of the design elements of the object to be designed (S17: design order determining step).

Figures 17, 18:
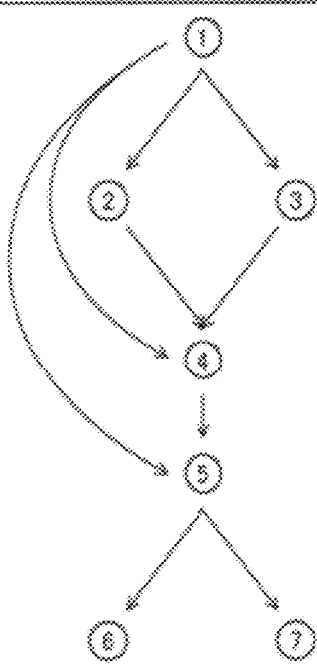
FIG. 17
FIG. 18

FIG. 17 is an explanatory view showing an example of how the order of the design elements is determined by the design workflow construction apparatus 10. FIG. 18 is an explanatory view showing an example of how the order of the design elements is determined by the design workflow construction apparatus 10.

In the present embodiment, it is assumed that a design workflow is created by dividing a design task of the object to be designed into the entity design elements in the third column from the left in FIG. 10. Further, it is assumed that "generation design" is an important design variable. An algorism of determining the design order by the design order determining section 12 is similar to a conventional DSM, but is different from the conventional DSM in that the design order determining section 12 determines not only an order of design tasks of the entity design elements, but also an order of determination tasks of the important design variables.

Specifically, the design order determining section 12 first acquires a list indicative of the design tasks (general-purpose logic circuit design, cache circuit design, I/O circuit design, memory design, junction design, and board design) whose order is to be determined, the important design variables, and dependency ("x" of FIG. 17) among the design tasks and the important design variables. Note that the dependency among the design tasks and the important design variables, i.e., positions of "x" may be registered in advance in the definitions (D6) of the design elements or may be determined with reference to FIGS. 10 and 11 through 15.

Next, the order of the design tasks and the order of determination tasks of the important design variables are rearranged so that the number of marks "x" appearing in an upper right portion of the matrix becomes smallest. Thus, the order of the design tasks and the important design variables are determined. Note that FIG. 17 shows a state in which the number of marks "x" appearing in the upper right portion of the matrix becomes smallest. After the matrix as shown in FIG. 17 is obtained, the design order determining section 12 determines, based on the matrix thus obtained, the order of the design tasks and the order of determination of the important design variables as shown in FIG. 18, and then supplies design order information to the evaluation approach construction section 13 and the design workflow construction section 14.

Next, the evaluation approach construction section 13 constructs a design approach for the object to be designed on the basis of the definition (D2) of the evaluation function (SDSIC) of the object to be designed, the definitions (D3) of the features of the object to be designed, the definitions (D4) of the relationships between the entities and the features of the object to be designed, the definitions (constraint formula D5 among the features) of the constraint formulas among the features of the object to be designed, and the definitions (design element specifying information D6) of the design elements (S18: evaluation approach construction step).

The design approach for the object to be designed is an evaluation formula for evaluating a design result of each of the entity design elements. The evaluation formula can be generated for each of the entity design elements with the use of a constraint formula D5 among the features. In the evaluation formula, an intermediate variable obtained as a design result of an entity design element is expressed by using, as variables, only input variables, design variables, and intermediate variables obtained as a design result of another entity design element. Then, the evaluation approach construction section 13 supplies the evaluation formula thus generated to the design workflow construction section 14.

Next, the design workflow construction section 14 constructs a design workflow (FIG. 19) for the object to be designed on the basis of the design order information generated by the design order determining section 12 and the evaluation formula generated by the evaluation approach construction section 13 (S19: design workflow construction step).

Specifically, the design workflow construction section 14 generates a design workflow by connecting the design elements in accordance with the design order indicated by the design order information. Then, the design workflow construction section 14 associates an evaluation formula with each of the entity design elements in the design workflow. Further, the design workflow construction section 14 constructs the design workflow so that a value of an intermediate variable determined as a design condition in an evaluation formula of a first entity design element can be acquired with reference to a value of an intermediate variable obtained as a design result of a second entity design element that is designed earlier than the first entity design element.

Specifically, "package area" in (b) of FIG. 16 is associated with "system LSI" in the leftmost column of FIG. 10, and is therefore used in the "system evaluation" task in FIG. 19. In the formula of "package area", a variable "the number of external terminals" is used as an input variable, and variables "external terminal pitch", "logic chip area", and "memory chip area" are used as intermediate variables. Out of these intermediate variables, "logic chip area" and "memory chip area" are associated with the entity design elements "logic chip" and "memory chip" in the second column from the left in FIG. 10, respectively. That is, "logic chip area" and "memory chip area" are respectively determined as design results in the "general-purpose logic circuit design" task and "memory design" task that are located upstream of the "system evaluation" task of FIG. 19. Accordingly, the design workflow construction section 14 sets the design workflow so that the formula "package area" is calculated in the "system evaluation" task with reference to values of the "logic chip area" and "memory chip area" respectively determined in the "general-purpose logic circuit design" task and "memory design" task.

Subsequently, the design workflow construction apparatus 10 sets, to the automatic design apparatus 20, the design workflow constructed by the design workflow construction section 14.

Finally, the automatic design apparatus 20 finds an appropriate solution of the object to be designed on the basis of the design workflow (S20).

As described above, (1) the design system 1 including the design workflow construction apparatus 10 and the automatic design apparatus 20 has a function of inputting a design specification etc., a function of defining a product profile, a function of performing analysis/evaluation on the basis of the definition of the product profile, a function of determining a design flow on the basis of the definition of the product profile, a function of constructing a design workflow on the basis of the analysis/evaluation technique and the design flow and performing automatic solution search/optimization, and a function outputting a design solution, and has a technique allowing these functions to collaborate with each other.

Collaboration among these six functions makes it possible to hierarchically define an object to be designed (product) from the viewpoint of entities and functions so as to construct an efficient design flow in which design elements are sequentially designed in the order of importance, i.e., order of influence on the whole system. This makes it possible to parametrically handle the design elements and to create a design workflow for efficiently finding an optimum design solution by combining the series of design elements. By performing automatic solution search/optimization on the basis of the design workflow, it is possible to find an appropriate solution in consideration of the whole system.

The design workflow construction apparatus 10 is characterized especially in a new prioritized design flow construction approach ((2) described below) and a new analysis/evaluation collaboration approach ((3) described below) in the collaboration of the six functions. In the new prioritized design flow construction approach, entity design elements (sub-systems) defined by the product profile and important design variables which influence the entire sub-systems are determined as design elements, and the design elements are sequentially designed in the order of importance. The new analysis/evaluation collaboration approach allows all the design elements to be parametrically analyzed/evaluated, and is compatible with the prioritized design flow.

(2) According to the design workflow construction apparatus 10, the order of determining the important design variables is determined along with the design order of the entity design elements. Since the order of determining the important design variables is determined in consideration of dependency of the intermediate variables among the entity design elements when the design order of the entity design elements is determined, entire design of the object to be designed can be made more efficient as compared with a case where only dependency of the intermediate variables among the entity design elements is considered. That is, it is possible to construct an efficient design workflow in consideration of the entire design.

(3) According to the design workflow construction apparatus 10, a design workflow specifying the design order of the entity design elements is created in accordance with the design order information, and an evaluation formula is associated with each of the entity design elements in the design workflow. Further, the design workflow is constructed so that a value of an intermediate variable determined a design condition of a first entity design element can be acquired with reference to a value of an intermediate variable obtained as a design result of a second entity design element that is designed earlier than the first entity design element. This makes it possible to construct an efficient design workflow in consideration of the entire design. Further, it is possible to efficiently accomplish unified use of an intermediate variable shared in design of a plurality of entity design elements.

Finally, the blocks of the design workflow construction apparatus 10 of the design system 1, especially, the design order determining section 12, the evaluation approach construction section 13, and the design workflow construction section 14 may be realized by way of hardware with the use of a logical circuit formed on an integrated circuit (IC chip) or software as executed by a CPU (Central Processing Unit).

In the latter case, the design workflow construction apparatus 10 includes a CPU and memory devices (memory media). The CPU executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the design workflow construction apparatus 10 a computer-readable storage medium containing control program code (executable program, intermediate code program, or source program) for the design workflow construction apparatus 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or a logical circuit, such as a PLD (Programmable logic device) or an FPGA (Field Programmable Gate Array).

The design workflow construction apparatus 10 may be arranged to be connectable to a communications network so that the program code may be delivered over the communications network. The communications network is not limited in any particular manner provided that the program code can be delivered, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited to a specific arrangement or a specific type provided that it is a medium which can deliver the program code, and may be, for example, wired line, such as IEEE 1394, USB, electric power line, cable TV line, telephone line, or ADSL (Asymmetric Digital Subscriber Line) line; or wireless, such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network.

A design workflow construction apparatus of the present invention for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises: specifying information acquisition means for acquiring entity design element specifying information for specifying the plurality of entity design elements and important design variable specifying information for specifying, as important design variables, part or all of the design variables; and design order determining means for determining an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

Further, a design workflow construction method of the present invention for a design workflow construction apparatus for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of: causing design order determining means of the design workflow construction apparatus to acquire entity design element specifying information for specifying the plurality of entity design elements and important design variable specifying information for specifying, as important design variables, part or all of the design variables; and causing the design order determining means to determine an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

According to the arrangement, the order of determining the important design variables is also determined in consideration of dependency of the intermediate variables among the entity design elements when the design order of the entity design elements is determined. This makes it possible to make entire design of the object to be designed more efficient as compared with a case where only the dependency of the intermediate variables among the entity design elements is considered. That is, it is possible to produce an effect that an efficient design workflow can be constructed in consideration of entire design.

Further, the design workflow construction apparatus of the present invention is arranged such that the design order determining means determines, as the important design variables, design variables that are used as a design condition for largest number of entity design elements out of the design variables.

The arrangement produces an effect of reducing a design space of each entity design element, reducing interdependence among design spaces, and thereby increasing independence of each design. Note that in a case where the number of important design variables is too large, design issues are distilled to a single design issue. This causes an explosive increase in design space, thereby making design solution search insufficient. On this account, the number of important design variables needs to be appropriately adjusted.

Further, the design workflow construction apparatus of the present invention is arranged such that the plurality of entity design elements are obtained by dividing a definition of an entity configuration so that a design workflow can be properly constructed, the definition of the entity configuration being divided to such an extent that functions of the object to be designed that are obtained from definitions of features of the object to be designed can be properly handled.

The arrangement produces an effect of reducing complexity of dependency among the entity design elements.

In order to attain the above object, a design workflow construction apparatus of the present invention for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises: evaluation approach construction means for (i) acquiring a constraint formula for each of the plurality of entity design elements and (ii) generating an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and design workflow construction means for (i) acquiring design order information indicative of a design order of the plurality of entity design elements, (ii) creating, in accordance with the design order information, a design workflow in which the design order of the plurality of entity design elements is specified, and (iii) associating the evaluation formula generated by the evaluation approach construction means with each of the plurality of entity design elements in the design workflow.

Further, a design workflow construction method of the present invention for a design workflow construction apparatus for supporting design of an object to be designed constituted by a plurality of entity design elements by individually designing the plurality of entity design elements is arranged such that in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of: (a) causing evaluation approach construction means of the design workflow construction apparatus to (i) acquire a constraint formula for each of the plurality of entity design elements and (ii) generate an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and (b) causing design workflow construction means of the design workflow construction apparatus to (i) acquire design order information indicative of a design order of the plurality of entity design elements, (ii) create, in accordance with the design order information, a design workflow in which the design order of the plurality of entity design elements is specified, and (iii) associate the evaluation formula generated in the step (a) with each of the plurality of entity design elements in the design workflow.

This makes it possible to achieve consistency between the design order information and the evaluation formula in the design workflow, thereby producing an effect that a design workflow can be naturally constructed. That is, it is possible to produce an effect that an efficient design workflow can be constructed in consideration of the entire design.

Further, the design workflow construction apparatus of the present invention is arranged such that the design workflow construction means constructs the design workflow so that a value of an intermediate variable determined as a design condition in the evaluation formula of the entity design element can be acquired with reference to a value of an intermediate variable obtained as a design result of another entity design element that is designed earlier than the entity design element.

According to the arrangement, the design workflow is constructed so that a value of an intermediate variable determined as a design condition in the evaluation formula of the entity design element can be acquired with reference to a value of an intermediate variable obtained as a design result of another entity design element that is designed earlier than the entity design element.

This produces an effect that unified use of intermediate variables shared in design of a plurality of entity design elements can be efficiently accomplished.

Further, the design workflow construction apparatus of the present invention is arranged such that the plurality of entity design elements are obtained by dividing a definition of an entity configuration so that a design workflow can be properly constructed, the definition of the entity configuration being divided to such an extent that functions of the object to be designed that are obtained from definitions of features of the object to be designed can be properly handled.

The arrangement produces an effect of further reducing complexity of dependency among the entity design elements.

In order to attain the above object, a design system of the present invention for supporting design of an object to be designed constituted by a plurality of entity design elements by individually designing the plurality of entity design elements, includes: a function of acquiring a design specification of the object to be designed and an evaluation index for evaluating a value of the object to be designed in the design specification; a function of acquiring profile data of the object to be designed; a function of extracting the entity design elements from the profile data and prioritizing the entity design elements so as to construct a design workflow; a function of associating, with the design workflow thus constructed, an evaluation approach for performance/evaluation of a design result of each of the entity design elements; a function of finding an appropriate solution by performing automatic optimization while evaluating the design result with use of the evaluation index in accordance with the design workflow with which the evaluation approach is associated; and a function of outputting the appropriate solution thus found.

Further, a design method of the present invention for a design system for supporting design of an object to be designed constituted by a plurality of entity design elements by individually designing the plurality of entity design elements, includes the steps of: causing a design workflow construction apparatus constituting the design system to acquire a design specification of the object to be designed and an evaluation index for evaluating a value of the object to be designed in the design specification; causing the design workflow construction apparatus to acquire profile data of the object to be designed; causing the design workflow construction apparatus to extract the entity design elements from the profile data and prioritize the entity design elements so as to construct a design workflow; causing the design workflow construction apparatus to associate, with the design workflow thus constructed, an evaluation approach for performance/evaluation of a design result of each of the entity design elements; causing the design workflow construction apparatus to find an appropriate solution by performing automatic optimization while evaluating the design result with use of the evaluation index in accordance with the design workflow with which the evaluation approach is associated; and causing the design workflow construction apparatus to output the appropriate solution thus found.

The arrangement allows the following series of functions to systematically collaborate: "(i) definition of design specification and evaluation index", "(ii) definition of profile of object to be designed", "(iii) data flow structure", "(iv) function/performance evaluation of object to be designed", "(v) process automation/solution search", and "(vi) output of design result".

The functions (i) through (iv) are associated with the sections (FIG. 1) of the design system 1 as follows.

The "(i) definition of design specification and evaluation index" is achieved by a function of acquiring, from the data storage section 11, an evaluation function (SDSI-C) (D2 of FIG. 1) as an evaluation index for evaluating a value of the object to be designed. The "(ii) definition of profile of object to be designed" is achieved by a function of acquiring, from the data storage section 11, the data (D1, D3, D4, and D5 of FIG. 1) as profile data of the object to be designed. The "(iii) data flow structure" is achieved by a function (the design order determining section 12) of constructing a design workflow on the basis of data D6 that is determined by a designer on the basis of the data of the "(ii) definition of profile of object to be designed". The "(iv) function/performance evaluation of object to be designed" is achieved by a function (the evaluation approach construction section 13) of associating an evaluation approach for performance/evaluation of a design result with each of the entity design elements. The "(v) process automation/solution search" is achieved by a function of finding an appropriate solution by causing the automatic design apparatus 20 to execute the design workflow constructed by the design workflow construction section 14 so as to carry out automatic optimization while evaluating a design result with the use of the evaluation index. The "(vi) output of design result" is achieved by a function of outputting, as a result of the whole design system 1, the appropriate solution found by the automatic design apparatus 20.

By thus causing the systems engineering techniques, which have been conventionally used independently, to collaborate with each other, it is possible to systematically design a system. That is, it is possible to produce an effect that an efficient design workflow can be constructed in consideration of the entire design.

Further, the design system of the present invention is arranged such that the plurality of entity design elements are obtained by dividing a definition of an entity configuration so that the design workflow can be properly constructed, the definition of the entity configuration being divided to such an extent that functions of the object to be designed that are obtained from definitions of features of the object to be designed can be properly handled.

The arrangement produces an effect of further reducing complexity of dependency among the entity design elements.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention makes it possible to construct a framework which allows a system having a complicated structure to be designed in consideration of entire design. Accordingly, the present invention can be widely applied to design of complicated systems, and is especially suitable for design of a system having a physical entity configuration as well as a system, such as software, having a logical entity configuration.

REFERENCE SIGNS LIST

1: Design system
10: Design workflow construction apparatus
11: Data storage section
12: Design order determining section (design order determining means)
12a: Specifying information acquisition section (specifying information acquisition means)
13: Evaluation approach construction section (evaluation approach construction means)
14: Design workflow construction section (Design workflow construction means)
20: Automatic design apparatus

The invention claimed is:

1. A design workflow construction apparatus for supporting design of an object to be designed constituted by a plurality of entity design elements by individually designing the plurality of entity design elements, wherein:

in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises:

specifying information acquisition means for acquiring entity design element specifying information for specifying the plurality of entity design elements and important design variable specifying information for specifying, as important design variables, part or all of the design variables; and design order determining means for determining an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

2. The design workflow construction apparatus according to claim 1, wherein:

the design order determining means determines, as the important design variables, design variables that are used as a design condition for largest number of entity design elements out of the design variables.

3. The design workflow construction apparatus according to claim 1, wherein:

the plurality of entity design elements are obtained by dividing a definition of an entity configuration so that a design workflow can be properly constructed, the definition of the entity configuration being divided to such an extent that functions of the object to be designed that are obtained from definitions of features of the object to be designed can be properly handled.

4. A design workflow construction program for causing a computer to function as a design workflow construction apparatus as set forth in claim 1, the design workflow construction program causing the computer to function as the design order determining means.

5. A computer readable recording medium in which the design workflow construction program as set forth in claim 4 is stored.

6. A design workflow construction method for a design workflow construction apparatus for supporting design of an object to be designed constituted by a plurality of entity design elements by individually designing the plurality of entity design elements, wherein:

in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of:

causing design order determining means of the design workflow construction apparatus to acquire entity design element specifying information for specifying the plurality of entity design elements and important design variable specifying information for specifying, as important design variables, part or all of the design variables; and causing the design order determining means to determine an order of designing the plurality of entity design elements and an order of determining the important design variables so as to reduce the number of combinations of entity design elements in which an intermediate variable determined as a design condition of a first entity design element becomes an intermediate variable obtained as a design result of a second entity design element that is designed later than the first entity design element.

7. A design workflow construction apparatus for supporting design of an object to be designed constituted by a plurality of entity design elements by individually designing the plurality of entity design elements, wherein:

in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction apparatus comprises:

evaluation approach construction means for (i) acquiring a constraint formula for each of the plurality of entity design elements and (ii) generating an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and design workflow construction means for (i) acquiring design order information indicative of a design order of the plurality of entity design elements, (ii) creating, in accordance with the design order information, a design workflow in which the design order of the plurality of entity design elements is specified, and (iii) associating the evaluation formula generated by the evaluation approach construction means with each of the plurality of entity design elements in the design workflow.

8. The design workflow construction apparatus according to claim 7, wherein:

the design workflow construction means constructs the design workflow so that a value of an intermediate variable determined as a design condition in the evaluation formula of the entity design element can be acquired with reference to a value of an intermediate variable obtained as a design result of another entity design element that is designed earlier than the entity design element.

9. The design workflow construction apparatus according to claim 7, wherein:

the plurality of entity design elements are obtained by dividing a definition of an entity configuration so that a design workflow can be properly constructed, the definition of the entity configuration being divided to such an extent that functions of the object to be designed that are obtained from definitions of features of the object to be designed can be properly handled.

10. A design workflow construction program for causing a computer to function as a design workflow construction apparatus as set forth in claim 7, the design workflow construction program causing the computer to function as said each means of the design workflow construction apparatus.

11. A computer readable recording medium in which the design workflow construction program as set forth in claim 10 is stored.

12. A design workflow construction method for a design workflow construction apparatus for supporting design of an object to be designed constituted by a plurality of entity design elements by individually designing the plurality of entity design elements, wherein:

in design of the object to be designed, input variables, design variables, and intermediate variables are used, the input variables being given in advance when the object to be designed is designed, the design variables being determined when the plurality of entity design elements are designed, and the intermediate variables being uniquely determined when the input variables and the design variables are determined, in design of each of the plurality of entity design elements, at least part of a variable group constituted by the input variables, the design variables, and the intermediate variables is used as a design condition, and intermediate variables that are not used as the design condition are determined as a design result, and the design workflow construction method comprises the steps of:

(a) causing evaluation approach construction means of the design workflow construction apparatus to (i) acquire a constraint formula for each of the plurality of entity design elements and (ii) generate an evaluation formula for the entity design element with use of the constraint formula, the constraint formula expressing an intermediate variable obtained as a design result of the entity design element by using, as variables, only the input variables, the design variables, and intermediate variables obtained as a design result of a sub-entity design element constituting the entity design element, the evaluation formula expressing the intermediate variable obtained as the design result of the entity design element by using, as variables, only the input variables, the design variables, and intermediate variables obtained as a design result of another entity design element; and (b) causing design workflow construction means of the design workflow construction apparatus to (i) acquire design order information indicative of a design order of the plurality of entity design elements, (ii) create, in accordance with the design order information, a design workflow in which the design order of the plurality of entity design elements is specified, and (iii) associate the evaluation formula generated in the step (a) with each of the plurality of entity design elements in the design workflow.

13. A design system for supporting design of an object to be designed constituted by a plurality of entity design elements by individually designing the plurality of entity design elements, comprising:

a function of acquiring a design specification of the object to be designed and an evaluation index for evaluating a value of the object to be designed in the design specification;

a function of acquiring profile data of the object to be designed;

a function of extracting the entity design elements from the profile data and prioritizing the entity design elements so as to construct a design workflow;

a function of associating, with the design workflow thus constructed, an evaluation approach for performance/evaluation of a design result of each of the entity design elements;

a function of finding an appropriate solution by performing automatic optimization while evaluating the design result with use of the evaluation index in accordance with the design workflow with which the evaluation approach is associated; and a function of outputting the appropriate solution thus found.

14. The design system according to claim 13, wherein:

the plurality of entity design elements are obtained by dividing a definition of an entity configuration so that the design workflow can be properly constructed, the definition of the entity configuration being divided to such an extent that functions of the object to be designed that are obtained from definitions of features of the object to be designed can be properly handled.

15. A design method for a design system for supporting design of an object to be designed constituted by a plurality of entity design elements by individually designing the plurality of entity design elements, comprising the steps of:
- causing a design workflow construction apparatus constituting the design system to acquire a design specification of the object to be designed and an evaluation index for evaluating a value of the object to be designed in the design specification;
- causing the design workflow construction apparatus to acquire profile data of the object to be designed;
- causing the design workflow construction apparatus to extract the entity design elements from the profile data and prioritize the entity design elements so as to construct a design workflow;
- causing the design workflow construction apparatus to associate, with the design workflow thus constructed, an evaluation approach for performance/evaluation of a design result of each of the entity design elements;
- causing the design workflow construction apparatus to find an appropriate solution by performing automatic optimization while evaluating the design result with use of the evaluation index in accordance with the design workflow with which the evaluation approach is associated; and
- causing the design workflow construction apparatus to output the appropriate solution thus found.

* * * * *